US012762530B2

(12) United States Patent
Kievit et al.

(10) Patent No.: US 12,762,530 B2
(45) Date of Patent: Oct. 13, 2026

(54) SYSTEMS AND METHODS FOR PEER-TO-PEER SECURED INSTRUMENT SECURITIZATION

(71) Applicant: Synchrony Bank, Stamford, CT (US)

(72) Inventors: William Kievit, Stamford, CT (US); Michael Storiale, Stamford, CT (US); Kaeli Bridges, Stamford, CT (US); Felicia Weathers, Stamford, CT (US); Cody White, Stamford, CT (US); Shruti Joshi, Stamford, CT (US); Katie Bueltel, Stamford, CT (US); Dominika Lichomska, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/768,168

(22) Filed: Jul. 10, 2024

(65) Prior Publication Data

US 2025/0021958 A1 Jan. 16, 2025

Related U.S. Application Data

(60) Provisional application No. 63/512,835, filed on Jul. 10, 2023.

(51) Int. Cl.

| | |
|---|---|
| ***G06Q 40/00*** | (2023.01) |
| ***G06N 20/00*** | (2019.01) |
| ***G06Q 20/22*** | (2012.01) |
| ***G06Q 40/03*** | (2023.01) |

(52) U.S. Cl.

CPC ........... *G06Q 20/223* (2013.01); *G06N 20/00* (2019.01); *G06Q 40/03* (2023.01)

(58) Field of Classification Search

CPC ....... G06Q 20/223; G06Q 40/03; G06N 20/00

USPC ............ 705/35, 37, 38, 39, 40, 45; 709/226, 709/201, 227; 704/9; 701/425; 455/406; 715/753; 726/9, 6; 706/25, 45

See application file for complete search history.

(56) References Cited

U.S. PATENT DOCUMENTS

| | | | | |
|---|---|---|---|---|
| 11,132,689 B2 * | 9/2021 | Riechers | .............. | G06Q 20/202 |
| 11,321,697 B1 * | 5/2022 | MacDonald | ....... | G06Q 20/2295 |
| 11,900,451 B1 * | 2/2024 | King | .................. | G06Q 40/0631 |
| 12,530,668 B2 * | 1/2026 | Songa | .................... | G06N 20/00 |

(Continued)

OTHER PUBLICATIONS

Peer to Peer Real-Time Mobile Payment Scheme; 2022 International Arab Conference on Information Technology (ACIT) (2022, pp. 1-6); Mahmoud Obaid, Rami Hodrob; Nov. 22, 2022.. (Year: 2022).*

(Continued)

*Primary Examiner* — Tien C Nguyen

(74) *Attorney, Agent, or Firm* — .Polsinelli PC

(57) ABSTRACT

Systems and methods provide a framework through which securitization of a secured payment instrument is performed through real-time solicitation of peers for a security deposit associated with the secured payment instrument. The systems and methods, through training of machine learning algorithm, generate a recommendation for one or more peers that can be solicited for a security deposit associated with the secured payment instrument. If the security deposit is obtained, the secured payment instrument is issued. The security deposit is returned to the peers that contributed to the security deposit upon graduation of the secured payment instrument according to their pro rata contribution to the security deposit.

21 Claims, 9 Drawing Sheets

(56) References Cited

U.S. PATENT DOCUMENTS

| | | | | |
|---|---|---|---|---|
| 2012/0197800 | A1* | 8/2012 | Ross | G06Q 20/40<br>705/44 |
| 2014/0310150 | A1* | 10/2014 | Petty | G06Q 40/03<br>705/38 |
| 2017/0178236 | A1* | 6/2017 | Saigh | G06Q 40/04 |
| 2018/0025341 | A1* | 1/2018 | Chandra | G06Q 20/405<br>705/39 |
| 2020/0104845 | A1* | 4/2020 | Riechers | G06Q 20/202 |
| 2020/0104942 | A1* | 4/2020 | Riechers | G06Q 20/227 |
| 2021/0201404 | A1* | 7/2021 | Schwartz | G06N 20/00 |
| 2021/0407000 | A1* | 12/2021 | De Suza | G06N 20/00 |
| 2023/0368290 | A1* | 11/2023 | Peters | G06Q 40/03 |

OTHER PUBLICATIONS

An Optimistic Fair Peer-to-Peer Payment System; 2007 International Conference on Management Science and Engineering (2007, pp. 228-233); Liu Yi-chun; Aug. 20, 2007. (Year: 2007).*

* cited by examiner

SYSTEMS AND METHODS FOR PEER-TO-PEER SECURED INSTRUMENT SECURITIZATION

CROSS-REFERENCE TO RELATED APPLICATIONS

The present patent application claims the priority benefit of U.S. Provisional Patent Application 63/512,835 filed Jul. 10, 2023, the disclosures of which is incorporated herein by reference in its entirety.

FIELD

The present disclosure relates generally to a framework through which securitization of a secured payment instrument is performed through real-time solicitation of peers for a security deposit associated with the secured payment instrument.

SUMMARY

Disclosed embodiments provide a framework for the securitization of secured payment instruments through the automatic identification and solicitation of peers for contributions towards security deposits associated with the secured payment instruments. According to some embodiments, a computer-implemented method is provided. The computer-implemented method comprises receiving an application for a secured payment instrument. The application includes contact information corresponding to a set of peers associated with a user. The computer-implemented method further comprises training a machine learning algorithm to generate a recommendation for one or more peers from the set of peers for solicitation of a security deposit associated with the secured payment instrument. The machine learning algorithm is trained using the application, the contact information, and historical data corresponding to other users. The computer-implemented method further comprises obtaining the security deposit. The security deposit is obtained according to contributions associated with the one or more peers and the user. The computer-implemented method further comprises issuing the secured payment instrument. The secured payment instrument is secured by the security deposit. The computer-implemented method further comprises updating the machine learning algorithm. The machine learning algorithm is updated using transaction data corresponding to usage of the secured payment instrument, the contributions, and the historical data. The computer-implemented method further comprises detecting that an offer to graduate the secured payment instrument to an unsecured payment instrument is available. The computer-implemented method further comprises automatically disbursing an available amount from the security deposit according to the contributions and to a balance associated with the secured payment instrument.

In some embodiments, the computer-implemented method further comprises automatically processing the transaction data in real-time to identify one or more rewards associated with the secured payment instrument. The computer-implemented method further comprises distributing the one or more rewards according to the contributions.

In some embodiments, the computer-implemented method further comprises performing a credit evaluation associated with the user. The credit evaluation is performed in response to obtaining the security deposit. The computer-implemented method further comprises determining whether to issue the secured payment instrument based on the credit evaluation.

In some embodiments, the computer-implemented method further comprises automatically transmitting a solicitation for a contribution to the security deposit. The solicitation is transmitted according to the recommendation.

In some embodiments, the computer-implemented method further comprises providing the recommendation. When the recommendation is obtained by the user, the user solicits the one or more peers for a contribution to the security deposit. The computer-implemented method further comprises obtaining feedback corresponding to the recommendation and solicitation of the one or more peers for the contribution to the security deposit. The computer-implemented method further comprises dynamically updating the machine learning algorithm based on the feedback.

In some embodiments, the computer-implemented method further comprises providing a set of disbursement options for the contributions. The set of disbursement options are provided as a result of detecting that the offer is available. Further, the security deposit is automatically disbursed according to selections from the set of disbursement options.

In some embodiments, the computer-implemented method further comprises using a contribution associated with the user for the security deposit to settle the balance. The contribution is used in response to an acceptance of the offer to graduate the secured payment instrument to the unsecured payment instrument.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

Figure 1:
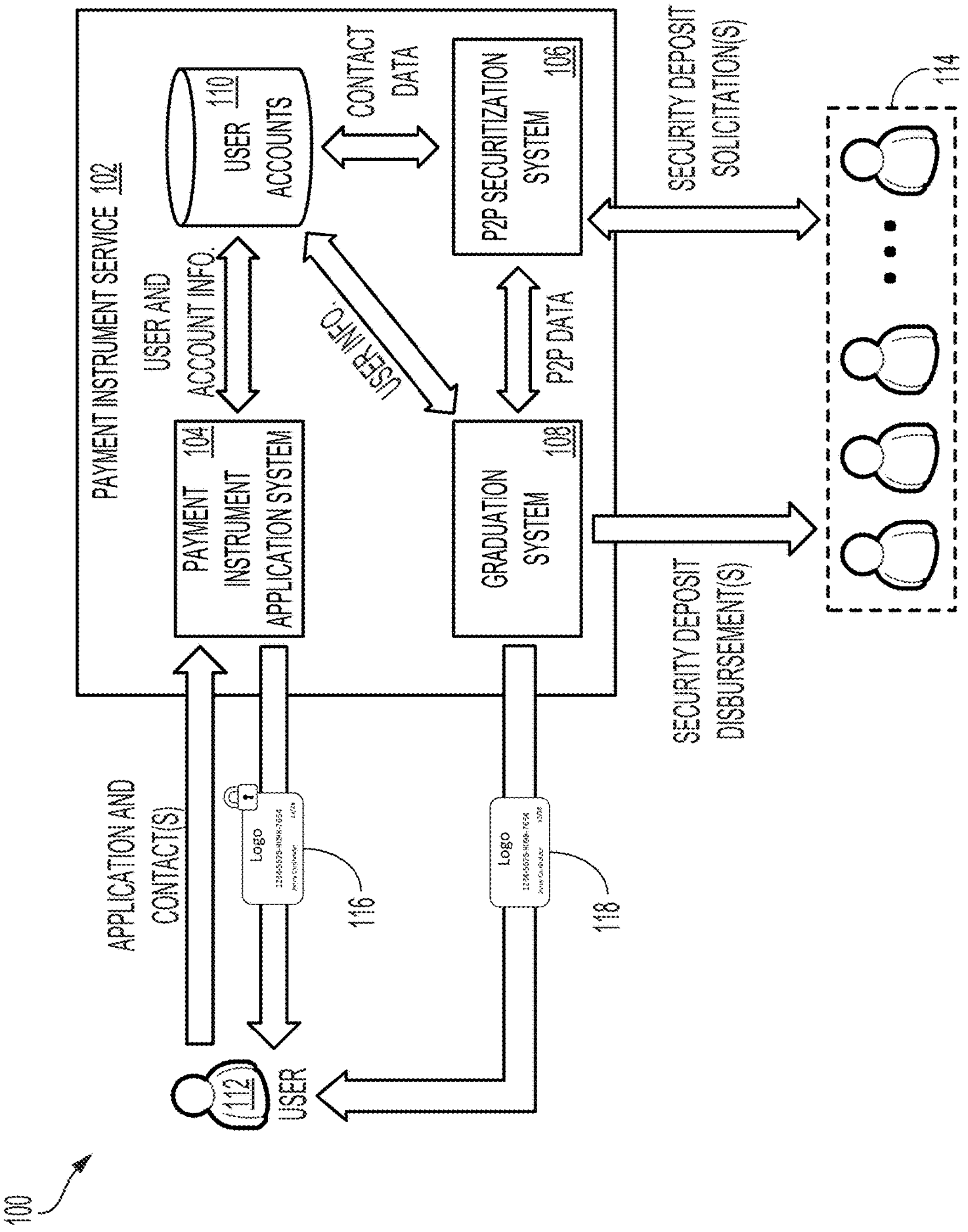
FIG. 1 shows an illustrative example of an environment in which a payment instrument service automatically and in real-time recommends one or more peers that can be solicited to obtain a security deposit for securitization of a secured payment instrument in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework through which securitization of a secured payment instrument is performed through real-time solicitation of peers for a security deposit associated with the secured payment instrument. For instance, in real-time, the systems and methods described herein may evaluate contact information corresponding to a set of peers associated with an account holder to generate a recommendation for one or more of these peers that may be solicited to contribute to a security deposit required to securitize a secured payment instrument. If the required security deposit is obtained, the systems and methods described herein may issue the secured payment instrument to the account holder and hold the security deposit in escrow in order to securitize the secured payment instrument. As the account holder utilizes their secured payment instrument, any rewards or other benefits earned through use of the secured payment instrument may be automatically distributed, in real-time, to the account holder and the one or more peers that contributed to the security deposit according to their contributions. Further, if the secured payment instrument is graduated to an unsecured payment instrument, any available amount from the security deposit is automatically disbursed to the account holder and the one or more peers according to their original contributions to the security deposit.

A secured payment instrument, as described in greater detail herein, may be a payment instrument associated with an account that is secured via a security deposit provided by an account holder and/or one or more peers associated with the account holder and held in escrow by the payment instrument service. An unsecured payment instrument may be a payment instrument associated with an account that is not secured by a security deposit. Graduation of a secured payment instrument to an unsecured payment instrument may include converting the secured payment instrument to an unsecured payment instrument by, for example, returning the security deposit for the payment instrument, adjusting the credit limit of the payment instrument, updating various credit reporting agencies of the graduation, and other such operations. Graduation of a secured payment instrument to an unsecured payment instrument may also be referred to herein as a promotion of a secured payment instrument to an unsecured payment instrument.

As used herein and unless otherwise made expressly clear, "promotion" of a secured payment instrument to an unsecured payment instrument refers to the systems and methods described herein for graduating a secured payment instrument to an unsecured payment instrument rather than the conventional meaning of "promotion" (e.g., offering an incentive to promote participation or engagement with services associated with the payment instrument).

FIG. 1 shows an illustrative example of an environment 100 in which a payment instrument service 102 automatically and in real-time recommends one or more peers 114 that can be solicited to obtain a security deposit for securitization of a secured payment instrument 116 in accordance with at least one embodiment. In the environment 100, a user 112, through use of a computing device (e.g., smartphone, tablet computer, desktop computer, etc.), may submit an application or other request to a payment instrument application system 104 of a payment instrument service 102 to obtain a line of credit associated with a secured payment instrument 116. In an embodiment, the application or other request submitted by the user 112 includes information that may be used to perform a credit inquiry of the user's credit report to determine whether the user 112 is qualified for a line of credit associated with a secured payment instrument 116. For instance, through the application or other request, the user 112 may provide their legal name, birthdate, last four digits of their Social Security number, household income, and the like.

In an embodiment, the application or other request submitted by the user 112 includes contact information associated with a set of user peers 114 that the user 112 may be affiliated with (e.g., friends, colleagues, family members, etc.). The contact information may include, for each user peer, a name (e.g., legal name, username associated with the payment instrument service 102 or other entity, etc.), a physical address, a network address (e.g., e-mail address, etc.), a telephone number, demographic information, information denoting the relationship to the user 112, and the like. This contact information may be used to identify the set of user peers 114 associated with the user 112 and from which solicitations for contributions to a security deposit associated with the secured payment instrument 116 may be requested, as described in greater detail herein.

In some instances, the user 112 may be associated with an existing account associated with the payment instrument service 102 (e.g., a third-party payment instrument service, a merchant, etc.). For instance, the user 112 may have an existing account associated with the payment instrument service 102 whereby the user 112 may have one or more existing lines of credit associated with secured and/or unsecured payment instruments. If the user 112 is associated with an existing account associated with the payment instrument service 102, the payment instrument application system 104 may query a user accounts datastore 110 maintained by the payment instrument service 102 to obtain any required information from the user's account that may be used to supplement the application or other request to obtain a new line of credit associated with a secured payment instrument 116. For instance, if the user 112 has previously established other lines of credit associated with secured and/or unsecured payment instruments provided by the payment instrument service 102, the payment instrument application system 104 may obtain, from the user accounts datastore 110, any user information associated with these other lines of credit that may be used to perform the credit inquiry of the user's credit report. Similarly, if the user 112 has previously provided contact information associated with one or more user peers 114 for other secured payment instruments or for other purposes (e.g., peers designated as emergency contacts, peers with whom the user 112 may engage with through the payment instrument service 102, etc.), the payment instrument application system 104 may obtain this contact information from the user accounts datastore 110.

In some instances, the user 112 may not have a pre-existing relationship with the payment instrument service 102. For instance, the user 112 may be a new customer that is interested in establishing a new line of credit through the payment instrument service 102. As an illustrative example, the user 112 may be presented with advertisements related to the payment instrument service 102, whereby the user 112 may be presented with different payment instrument options, including an option for a secured payment instrument 116, that may generally be available from the payment instrument service 102. These advertisements may be presented in the form of billboards, radio media, television or digital video media, banner advertisements, pop-up advertisements, and the like. In response to these advertisements, the user 112 may access the payment instrument service 102 to submit an application or other request to determine whether the user 112 is eligible for the secured payment instrument 116 offered by the payment instrument service 102.

The payment instrument service 102, in an embodiment, is a service that, for example, processes applications for secured payment instruments, issues secured payment instruments, determines user-specific metrics for determining whether to adjust security deposits and/or credit limits associated with secured payment instruments, processes transactions associated with secured payment instruments, determines whether a secured payment instrument should be graduated to an unsecured payment instrument, processes the graduation of the secured payment instrument to an unsecured payment instrument, issues unsecured payment instruments, processes transactions associated with unsecured payment instruments, processes cancellations of accounts associated with secured and unsecured payment instruments, and performs other such operations. In an embodiment, the payment instrument service 102 is a service such as the service 912 described herein at least in connection with FIG. 9. In an embodiment, the payment instrument service 102 is a service provided by a merchant such as the merchants described herein at least in connection with FIG. 9. In an embodiment, the payment instrument service 102 is a service provided by a computing resources provider such as the computing resource provide 928 described herein at least in connection with FIG. 9 (e.g., a service such as service 930 and/or service 932 described herein at least in connection with FIG. 9). In an embodiment, the payment instrument service 102 is a payment instrument service such as the payment instrument service 938 described herein at least in connection with FIG. 9. In some instances, the payment instrument service 102 may be a service operated by the issuer of the secured payment instrument and/or the unsecured payment instrument. In some instances, the payment instrument service 102 may be a service operated by a third-party on behalf of the issuer of the secured payment instrument and/or the unsecured payment instrument.

The payment instrument application system 104 may be implemented using a computer system of the payment instrument service 102. In some instances, the payment instrument application system 104 may be implemented as an application or executable process that is executed on a computer system of the payment instrument service 102. In an embodiment, if the user 112 has provided a set of credentials corresponding to an existing account associated with the payment instrument service 102, the payment instrument application system 104 may authenticate the provided set of credentials to ensure that the set of credentials correspond to the existing account and that the user 112 is authorized to access this existing account. If the set of credentials are successfully authenticated, the payment instrument application system 104 may access the user accounts datastore 110 to retrieve any information required for a credit inquiry of the user's credit report from the user's existing account. If the user 112 does not have an existing account associated with the payment instrument service 102, the payment instrument application system 104 may forego this process of accessing the user accounts datastore 110 to retrieve the required information from an existing account.

In an embodiment, the payment instrument application system 104 automatically submits a credit inquiry to a credit reporting service to obtain a credit evaluation for the user 112. For instance, the result of the credit inquiry may include one or more credit scores associated with the user 112, the current amount of credit allocated to the user 112 from different financial entities (including the payment instrument service 102, if any), the current amount of credit available to the user 112, and the like. The credit reporting service may be associated with one or more credit agencies (e.g., Equifax®, TransUnion®, Experian®, etc.) or may otherwise interact with one or more credit agencies to provide credit reporting to users and other entities (such as the payment instrument application system 104). The payment instrument application system 104 may use the credit evaluation from the credit reporting service to determine whether the user 112 can be approved for a secured payment instrument that the user 112 has applied for. If the payment instrument application system 104 determines that the user 112 cannot be approved for the applied for secured payment instrument, the payment instrument application system 104 may transmit a notification to the user 112 to indicate that the user 112 was not approved for the secured payment instrument.

If the payment instrument application system 104 determines, based on the credit evaluation for the user 112, that the user 112 is approved for a secured payment instrument 116, the payment instrument application system 104 may transmit a notification to the user 112 that they have been approved for a new line of credit associated with a secured payment instrument. Additionally, the payment instrument application system 104 may provide any related terms and conditions related to the secured payment instrument that the user 112 has been approved for (e.g., actual annual percentage rate (APR), amount of a line of credit associated with the secured payment instrument, the security deposit required for the secured payment instrument, etc.).

In an embodiment, if the user 112 is approved for a secured payment instrument 116, the payment instrument application system 104 may transmit a notification to a peer-to-peer (P2P) securitization system 106 of the payment instrument service 102 to prompt the user 112 for a security deposit that may be required to securitize the secured payment instrument 116 before the secured payment instrument 116 may be issued to the user 112. The P2P securitization system 106 may be implemented using a computer system of the payment instrument service 102. In some instances, the P2P securitization system 106 may be implemented as an application or executable process that is executed on a computer system of the payment instrument service 102. In an embodiment, the P2P securitization system 106 obtains, from the user accounts datastore 110, the contact information associated with a set of user peers 114 provided by the user 112 in their application for the secured payment instrument 116 and/or previously associated with an existing user account.

In an embodiment, the P2P securitization system 106 automatically processes the contact information associated with the set of user peers 114 to generate a recommendation for one or more peers that may be solicited to contribute to the required security deposit for the secured payment instrument 116. For example, the P2P securitization system 106 may implement a machine learning algorithm or artificial intelligence that is dynamically trained to automatically identify, from provided contact information corresponding to a set of user peers 114, one or more peers that may be recommended to the user 112 for soliciting contributions to the security deposit associated with the secured payment instrument 116. The machine learning algorithm or artificial intelligence implemented by the P2P securitization system 106 may be trained using supervised, unsupervised, reinforcement, or other such training techniques. For instance, the machine learning algorithm or artificial intelligence implemented by the P2P securitization system 106 may be dynamically trained using a dataset comprising sample user account information (e.g., sample user information, sample peer information, etc.) and contribution records corresponding to the sample user account information (e.g., contributions made by a sample user and sample peers towards security deposits associated with sample secured payment instruments, etc.). This dataset may be analyzed using the machine learning algorithm or artificial intelligence to identify correlations between different elements of the dataset without supervision and feedback.

As an example of a supervised training technique, a dataset can be selected for training of the machine learning algorithm or artificial intelligence implemented by the P2P securitization system 106 to facilitate identification of correlations between user account information, solicitations for contributions to security deposits corresponding to secured payment instruments, and the actual contributions made to these security deposits. The machine learning algorithm or artificial intelligence implemented by the P2P securitization system 106 may be evaluated to determine, based on the sample inputs supplied to the machine learning algorithm or artificial intelligence, whether the machine learning algorithm or artificial intelligence is producing accurate correlations between members of a dataset (e.g., given a user's account information and contact information associated with a set of user peers 114, the machine learning algorithm or artificial intelligence is accurately recommending one or more user peers that are likely to contribute to the security deposit associated with a secured payment instrument).

As an illustrative example of the training of the machine learning algorithm or artificial intelligence implemented by the P2P securitization system 106, an evaluator of the machine learning algorithm or artificial intelligence may review the recommendations made by the machine learning algorithm or artificial intelligence to determine whether these recommendations correspond to the user account information, contact information associated with the set of user peers 114, and any historical data corresponding to the user 112 and the set of user peers 114. To determine whether these recommendations are appropriate, the evaluator may evaluate feedback corresponding to these recommendations. This feedback may include peer responses to requests for contributions to a security deposit, user selection of any of the recommended peers for solicitation of contributions towards the security deposit, and the like. The evaluator, using this feedback from the user 112 and/or the solicited peers may determine whether the recommendations made by the machine learning algorithm or artificial intelligence are appropriate or otherwise consistent with the user account information. Accordingly, based on this evaluation, the evaluator may re-train and/or improve the machine learning algorithm or artificial intelligence implemented by the P2P securitization system 106 to improve the likelihood of the machine learning algorithm or artificial intelligence making appropriate peer recommendations according to the user account information associated with the user 112.

In an embodiment, to dynamically train the machine learning algorithm or artificial intelligence used to automatically identify, from provided contact information corresponding to a set of user peers, one or more peers that may be recommended to a user for soliciting contributions to the security deposit associated with a secured payment instrument, the P2P securitization system 106 generates an initial iteration of the machine learning algorithm or artificial intelligence. For instance, the P2P securitization system 106 may initialize a set of coefficients $\{\alpha 1, \alpha 2, \alpha 3, \ldots \alpha n\}$ randomly according to a Gaussian distribution with low variance centered around zero. Using this initial iteration of the machine learning algorithm or artificial intelligence, the P2P securitization system 106 may process a training dataset comprising sample user account information and contribution records corresponding to the sample user account information to generate an output. This output may specify, for each sample set of data corresponding to a sample user account included in the dataset, an indication of one or more sample peers that may be likely to contribute towards the security deposit associated with a sample secured payment instrument. The P2P securitization system 106 may compare this output generated using the initial iteration of the machine learning algorithm or artificial intelligence to the sample set of peers defined in the dataset for each of the data points in the dataset (e.g., user account information for each sample user) to identify any inaccuracies or other errors.

If the output of the machine learning algorithm or artificial intelligence does not satisfy one or more criteria, the P2P securitization system 106 may iteratively update one or more coefficients of the set of coefficients to generate an updated machine learning algorithm or artificial intelligence. For instance, the one or more criteria may include a threshold for the accuracy of the desired machine learning algorithm or artificial intelligence for identifying different peers that may be likely to contribute towards security deposits for different secured payment instruments based on supplied user account information and contact information corresponding to different sets of peers. The updated machine learning algorithm or artificial intelligence may be used to process the aforementioned training dataset, as well as any additional data points or other datasets provided by the payment instrument service 102 to generate a new output for each data point in the training dataset. In some instances, the P2P securitization system 106 may use an optimization algorithm to iteratively update the one or more coefficients of the set of coefficients associated with the machine learning algorithm or artificial intelligence. For instance, the P2P securitization system 106 may use gradient descent to update the logistic coefficients of the machine learning algorithm or artificial intelligence to generate new cutoff values that may be used to classify the data points of the previously evaluated dataset and of any new data points obtained by the P2P securitization system 106. The P2P securitization system 106 may use this updated machine learning algorithm or artificial intelligence to process the available data points and generate a new output. The P2P securitization system 106 may evaluate this new output to determine whether the output satisfies the one or more criteria. This process of updating the set of coefficients associated with the machine learning algorithm or artificial intelligence according to the one or more criteria may be performed iteratively until an updated machine learning algorithm or artificial intelligence is produced that satisfies the one or more criteria.

In an embodiment, if the output generated by the machine learning algorithm or artificial intelligence satisfies the one or more criteria, the P2P securitization system 106 implements the machine learning algorithm or artificial intelligence to dynamically and in real-time identify, from provided contact information corresponding to different sets of user peers, different peers that may be recommended to the different users for soliciting contributions to the security deposits associated with different secured payment instrument for these different users. In an embodiment, the P2P securitization system 106 uses new data corresponding to contributions made to different security deposits associated with different secured payment instruments to further retrain or otherwise update the machine learning algorithm or artificial intelligence. For instance, as the machine learning algorithm or artificial intelligence produces, in real-time or near real-time, outputs corresponding to different peers that may be solicited for contributions towards security deposits associated with different secured payment instruments, the P2P securitization system 106 or other evaluator of the machine learning algorithm or artificial intelligence may evaluate the output to determine whether the machine learning algorithm or artificial intelligence is identifying peers that are likely to contribute towards these different security deposits as the new data is received. This evaluation may result in additional annotated data points that may be used to retrain or otherwise update the machine learning algorithm or artificial intelligence in real-time or near real-time. For instance, the P2P securitization system 106 may review any peer responses to requests for contributions to a security deposit, user selection of any of the recommended peers for solicitation of contributions towards the security deposit, and the like for a particular secured payment instrument to determine whether the machine learning algorithm or artificial intelligence has accurately identified a set of peers that was likely to contribute towards the security deposit. As an illustrative example, if one or more peers associated with the user 112 are solicited for a contribution to the security deposit associated with the secured payment instrument 116, and these one or more peers refuse to contribute to the security deposit, the P2P securitization system 106 may update the training dataset such that the machine learning algorithm or artificial intelligence is less likely to recommend, for similar users and secured payment instruments, similar peers for solicitation of contributions towards the security deposits associated with these similar secured payment instruments. Alternatively, if the one or more peers associated with the user 112 make contributions towards the security deposit associated with the secured payment instrument 116, the P2P securitization system 106 may update the training dataset such that the machine learning algorithm or artificial intelligence is more likely to recommend, for similar users and secured payment instruments, similar peers for solicitation of contributions towards the security deposits associated with these similar secured payment instruments. Thus, as users are approved for different secured payment instruments and as different sets of peers contribute towards the security deposits associated with these different secured payment instruments, the machine learning algorithm or artificial intelligence may be dynamically re-trained or otherwise updated to better recommend peers that may be likely to contribute towards security deposits associated with different secured payment instruments for which different users are approved.

It should be noted that the P2P securitization system 106, through the machine learning algorithm or artificial intelligence, can continuously and simultaneously process different contact information associated with different sets of user peers and corresponding to different user accounts (e.g., secured payment instruments) to generate recommendations for different peers that may be solicited for contributions towards security deposits associated with different secured payment instruments. For instance, as the P2P securitization system 106 receives or otherwise obtains different sets of contact information associated with different peers associated with different users and corresponding to newly approved secured payment instruments, the P2P securitization system 106, through the machine learning algorithm or artificial intelligence, may continuously and simultaneously process these different sets of contact information and corresponding user account information associated with the different users to generate, for each user, a recommendation corresponding to one or more peers that may be solicited for contributions towards a security deposit associated with a particular secured payment instrument. Additionally, as different peers contribute (or refuse to contribute) to the security deposits associated with different secured payment instruments, the P2P securitization system 106 may continuously and simultaneously process this feedback to refine the machine learning algorithm or artificial intelligence. In some instances, the P2P securitization system 106 may be configured with various special-purpose components that can facilitate real-time or near real-time processing of different user account information and corresponding peer contact data as any number of different users are approved for new secured payment instruments. Further, these various special-purpose components may be configured to automatically and in real-time or near real-time generate a set of recommendations for peers that may be solicited for contributions towards different security deposits associated with different secured payment instruments through the aforementioned machine learning algorithm or artificial intelligence.

In an embodiment, the payment instrument service 102 is associated with a P2P payment platform or other P2P platform through which a user 112 may communicate with a set of user peers 114 via communications sessions made available by the P2P payment platform or other P2P platform. For example, the payment instrument service 102 may be associated with a P2P payment platform through which users may make payments to other peers and receive payments from other peers through different transactions within the P2P payment platform. For example, a user 112, through a P2P payment platform, may submit a payment request to a friend to obtain a payment corresponding to a lunch meeting the user 112 and their friend recently attended. In response to the payment request, the user's friend may transmit, through the P2P payment platform, a payment to the user 112. In response to this payment, the P2P payment platform may automatically update the user's account associated with the P2P payment platform to indicate the amount received from the user's friend. This amount may be represented as a balance associated with the user account, which the user 112 may leverage for payments to other entities associated with the P2P payment platform or transfer to a linked account (e.g., bank account, credit union account, etc.).

As another illustrative example, a user 112, through the P2P payment platform, may receive a payment request from a friend for an item purchased by the user 112. The payment request may indicate the amount request, an invoice corresponding to the item purchased by the user 112, and user information corresponding to the user's friend. The user 112, through the P2P payment platform, may review the payment request and determine whether to submit a payment to the requesting friend. Through the P2P payment platform, the user 112 may transmit the payment to the user's friend. The amount corresponding to this payment may be obtained from the user's available balance associated with their account maintained by the P2P payment platform. In some instances, if the user 112 does not have an amount sufficient for the payment within their account, the P2P payment platform may automatically obtain any required amounts from the user's linked account (e.g., bank account, credit union account, etc.) in order to provide the full payment to the user's friend.

In an embodiment, the payment instrument service 102, through the P2P securitization system 106 automatically obtains, in real-time, communications and transaction data corresponding to user 112 interactions with a set of user peers 114 through one or more P2P payment platforms as these interactions occur. The communications and transaction data may include any messages exchanged between a user 112 and different peers through different communications sessions facilitated by the P2P payment platform. Further, the communications and transaction data may include information corresponding to transactions between the user 112 and these different peers through the P2P payment platform. In an embodiment, the P2P securitization system 106 processes the communications and transaction data, along with the provided contact information corresponding to the set of user peers 114, using the aforementioned machine learning algorithm or artificial intelligence to generate a set of recommendations corresponding to one or more peers that may be solicited to contribute to the required security deposit for the secured payment instrument 116.

As an illustrative example, if the user 112 has engaged a particular peer over the P2P payment platform for various transactions and/or has developed a strong rapport through which the user 112 and the particular peer have provided each other with financial assistance, the machine learning algorithm or artificial intelligence may recommend soliciting this particular peer for a contribution to the security deposit. Alternatively, if the user 112 has engaged a particular peer over the P2P payment platform in order to provide payments for goods/services provided by the particular peer, the machine learning algorithm or artificial intelligence may be less likely to recommend soliciting this particular peer for a contribution to the security deposit.

In some instances, the P2P securitization system 106 may use natural language processing (NLP) or other such algorithms to automatically, and in real-time, any messages exchanged between the user 112 and any of the set of user peers 114 as these messages are exchanged to identify which peers may be solicited for a contribution to the security deposit. For example, if a peer associated with the user 112 expresses, in a message to the user 112 exchanged via a communications session associated with a P2P payment platform, that the peer needs to borrow money from the user 112, the P2P securitization system 106 may automatically determine that this peer is a poor candidate from which to solicit a contribution to the security deposit associated with the secured payment instrument 116. As another illustrative example, if a peer associated with the user 112 expresses that the user 112 can feel confident in reaching out to the peer for anything the user 112 may need, the P2P securitization system 106 may automatically determine that this peer is a good candidate from which to solicit a contribution to the security deposit associated with the secured payment instrument 116.

In an embodiment, once the P2P securitization system 106 has identified, from a set of user peers 114, one or more peers that may be recommended to the user 112 for solicitation of contributions to the security deposit, the P2P securitization system 106 can generate and provide recommendations corresponding to these one or more peers to the user 112. For example, through an interface provided by the payment platform service 102, the P2P securitization system 106 may present identifying information corresponding to the one or more user peers the P2P securitization system 106 has identified as being good candidates from which contributions to the security deposit may be obtained. Through this interface, the user 112 may select any peers from the set of user peers 114 that the user 112 may wish to solicit contributions to the security deposit associated with the secured payment instrument 116.

In an embodiment, any selections made by the user 112 of peers to which solicitations are to be provided for contributions to the security deposit are used to further train the machine learning algorithm or artificial intelligence implemented by the P2P securitization system 106. For example, if the user 112 selects one or more peers from those recommended by the machine learning algorithm or artificial intelligence, the P2P securitization system 106 may use this selection of the one or more peers as a positive indication that the machine learning algorithm or artificial intelligence has provided an accurate recommendation to the user 112 based on the contact information associated with the set of user peers 114 provided by the user 112, the user account information associated with the user 112, and any communications between the user 112 and any number of peers from the set of user peers 114. This positive indication or feedback may be used to reinforce the machine learning algorithm or artificial intelligence such that, for similar users and corresponding peers, the machine learning algorithm or artificial intelligence may provide similar recommendations. Alternatively, if the user 112 selects one or more peers other than those recommended by the machine learning algorithm or artificial intelligence, or foregoes selecting any peers for solicitation of contributions towards the security deposit, the P2P securitization system 106 may use this selection of the one or more peers as a negative indication that the machine learning algorithm or artificial intelligence has failed to provide an accurate recommendation to the user 112. This negative indication or feedback may be used to retrain the machine learning algorithm or artificial intelligence such that, for similar users and corresponding peers, the machine learning algorithm or artificial intelligence may provide alternative recommendations.

If the user 112 selects one or more peers from which to solicit a contribution to the security deposit, the P2P securitization system 106 may automatically transmit a request to each of the selected one or more peers to solicit a contribution to the security deposit. The request may indicate an identifier corresponding to the user 112 (e.g., legal name, username, account number, etc.), an amount corresponding to the security deposit required for the secured payment instrument 116, and any other information that may be provided to the peer regarding the contribution (e.g., any applicable terms and conditions, benefits associated with making a contribution to the security deposit (pro rata cash back rewards, pro rata loyalty point rewards, discounts, coupons, etc.), etc.). In some instances, the user 112 may indicate, in their selection of the one or more peers, the amount that is to be requested from each individual peer towards the total security deposit. For instance, if the total security deposit is $500, the user 112 may select a peer that may be solicited for $300 and another peer that may be solicited for $200. This may allow the user 112 to tailor the solicitations made to the selected peers according to the user's preferences, which may be based on the user's personal knowledge of these selected peers.

In an embodiment, the solicitations made to the peers selected by the user 112 are subject to a time limit, whereby the security deposit needs to be collected from the selected peers and/or from the user 112 before expiration of the time limit. For instance, if the time limit expires and the security deposit has not been obtained, the P2P securitization system 106 may transmit a notification to the payment instrument application system 104 to indicate that the secured payment instrument 116 could not be securitized. Accordingly, the payment instrument application system 104 may automatically reject the application for the new secured payment instrument 116. The user 112 and the selected peers may be provided with an indication of the time limit or a timer corresponding to the time limit for obtaining the security deposit. This may allow the user 112 and the selected peers to determine the amount of time remaining in order to make a contribution to the security deposit.

In an embodiment, if the amount obtained from the user 112 and/or from the selected peers towards the security deposit is less than the requested amount, the P2P securitization system 106 transmits a notification to the payment instrument application system 104 to indicate that the secured payment instrument 116 is to have a credit limit according to the amount collected from the user 112 and/or the selected peers rather than to the original security deposit goal. The payment instrument application system 104 may provide the user 112 with an indication of the new security deposit for the secured payment instrument 116. As this new security deposit (and corresponding credit limit) is less than the original security deposit being sought for the secured payment instrument 116, the payment instrument application system 104 may provide the user 112 with an option to either accept the secured payment instrument 116 with the reduced security deposit and corresponding credit limit or to cancel their application for the secured payment instrument 116. This may allow the user 112 to still obtain a secured payment instrument 116 even if the security deposit goal is not achieved.

The P2P securitization system 106 may monitor user 112 and peer contributions to the security deposit to assign an allocation of rewards that may be provided to the user 112 and any peers that contributed to the security deposit as these rewards are earned. As an illustrative example, if the security deposit associated with the secured payment instrument 116 is $500, where a first peer contributed $300 towards the security deposit and the user 112 and a second peer each contributed $100 towards the security deposit, the P2P securitization system 106 may assign a 60% share of any rewards earned through use of the secured payment instrument 116 to the first peer and assign a 20% share to each of the user 112 and the second peer. Thus, the P2P securitization system 106 may reward each contributor to the security deposit according to their pro rata contribution.

In addition to assigning an allocation of rewards according to the contributions made by the user 112 and any selected peers towards the security deposit, the P2P securitization system 106 may monitor peer responses to the solicitation for a contribution to the security deposit in real-time to determine whether the selected peers have contributed to the security deposit or have opted not to contribute to the security deposit. Peer contributions (or lack thereof) may be used as a form of feedback that may be used by the P2P securitization system 106 to dynamically update the machine learning algorithm or artificial intelligence implemented to generate peer recommendations for solicitation of contributions to a security deposit. For example, if a selected peer opts to contribute to the security deposit, the P2P securitization system 106 may use this contribution as a positive indication that the machine learning algorithm or artificial intelligence has provided an accurate recommendation to the user 112. This positive indication or feedback may be used to reinforce the machine learning algorithm or artificial intelligence such that, for similar users and corresponding peers, the machine learning algorithm or artificial intelligence may provide similar recommendations. Alternatively, if a selected peer rejects the solicitation (e.g., refuses to provide a contribution within a pre-defined time limit, transmits a message to the user 112 rejecting the solicitation, etc.), the P2P securitization system 106 may use this response as a negative indication that the machine learning algorithm or artificial intelligence should not have recommended this particular peer. This negative indication or feedback may be used to retrain the machine learning algorithm or artificial intelligence such that, for similar users and corresponding peers, the machine learning algorithm or artificial intelligence is less likely to recommend similar peers.

Once the required security deposit has been obtained from the user 112 and/or from one or more user peers 114 (or an agreed-upon portion of the required security deposit is obtained), the payment instrument application system 104 may issue the secured payment instrument 116 to the user 112. In an embodiment, the payment instrument service 102 monitors, in real-time, transactions performed using the secured payment instrument 116 to determine whether any rewards have been earned for the secured payment instrument 116. For example, if the user 112 uses their secured payment instrument 116 for particular transactions (e.g., qualified purchases, promotional offers, etc.), the payment instrument service 102 may determine that the account associated with the secured payment instrument 116 is eligible for a cash back reward. As another example, if the secured payment instrument 116 is associated with a loyalty rewards program, whereby loyalty rewards (e.g., points, coupons, discounts, etc.) are awarded per transaction involving the secured payment instrument 116, the payment instrument service 102 may automatically allocate these loyalty rewards to the account associated with the secured payment instrument 116.

As one or more rewards are earned for the account associated with the secured payment instrument 116, the P2P securitization system 106 may determine how these one or more rewards may be distributed or otherwise made available to the user 112 and/or the peers that contributed to the security deposit associated with the secured payment instrument 116. As noted above, the P2P securitization system 106 may monitor user 112 and peer contributions to the security deposit to assign an allocation of rewards that may be provided to the user 112 and any peers that contributed to the security deposit as these rewards are earned on a pro rata basis. Thus, if the P2P securitization system 106 determines that the account is eligible for one or more rewards, the P2P securitization system 106 may access the user accounts datastore 110 to determine the pro rata distribution for the one or more rewards. Returning to a previous illustrative example, whereby the P2P securitization system 106 has assigned a 60% share of any rewards earned through use of the secured payment instrument 116 to the first peer and assigned a 20% share to each of the user 112 and the second peer, if the account is eligible for a $100 cash back reward, the first peer may be provided with a $60 cash back reward (based on their assigned 60% share) and the user 112 and the second peer may each receive a $20 cash back reward.

In an embodiment, a graduation system 108 implemented by the payment instrument service 102 can automatically monitor transactions of the secured payment instrument 116 to determine whether an offer of graduation may be provided to the user 112. The graduation system 108 may be implemented using a computer system of the payment instrument service 102. In some instances, the graduation system 108 may be implemented as an application or executable process that is executed on a computer system of the payment instrument service 102. In an embodiment, the determination of whether a secured payment instrument 116 should be graduated to an unsecured payment instrument 118 and/or to trigger the processing of the graduation of the secured payment instrument 116 to an unsecured payment instrument 118 is based on pre-determined criteria including, but not limited to, spending habits over a period of time, payment performance over a period of time, changes in credit scores over a period of time, and the like.

In an embodiment, the graduation system 108 implements and dynamically trains a machine learning algorithm or artificial intelligence to determine whether a secured payment instrument 116 should be graduated to an unsecured payment instrument 118 and/or to trigger the processing of the graduation of the secured payment instrument 118 to an unsecured payment instrument 116. The machine learning algorithm or artificial intelligence may be dynamically trained in real-time or near real-time using unsupervised learning techniques. For example, the graduation system 108 may implement a clustering algorithm to identify similar accounts, account holders, and/or secured payment instruments based on one or more vectors (e.g., spending habits, credit limits, payment performance, demographic information, credit scores, changes in credit scores, etc.). In some instances, a dataset of characteristics of accounts, users, and/or secured payment instruments may be analyzed using a clustering algorithm to determine whether a secured payment instrument should be graduated to an unsecured payment instrument and/or to trigger the processing of the graduation of the secured payment instrument to an unsecured payment instrument. Example clustering algorithms may be trained using the collected dataset. In an embodiment, clustering algorithms are trained using sample datasets of characteristics of accounts, customers, and/or secured payment instruments to classify accounts, users, and/or secured payment instruments in order to identify secured payment instruments that should be graduated to unsecured payment instruments and/or to trigger the processing of the graduation of the secured payment instrument 116 to an unsecured payment instrument 118. Examples of such clustering algorithms may include, but are not be limited to, k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

Based on the output of the machine learning algorithm or artificial intelligence built from an individual account, user, and/or secured payment instrument, a determination of whether a secured payment instrument 116 should be graduated to an unsecured payment instrument 118 and/or whether to trigger the processing of the graduation of the secured payment instrument 116 to an unsecured payment instrument 118, the graduation system 108 may prompt the user 112 to provide a response as to whether the user 112 wishes to have the secured payment instrument 116 graduated to an unsecured payment instrument 118. In an embodiment, the machine learning algorithm or artificial intelligence can alter and/or otherwise update the pre-determined criteria based on additional data and/or updates to the machine learning algorithm or artificial intelligence. In an embodiment, the determination of whether a secured payment instrument 116 should be graduated to an unsecured payment instrument 118 and/or to trigger the processing of the graduation of the secured payment instrument 116 to an unsecured payment instrument 118 is made in concert using a combination of a financial services expert and one or more machine learning algorithms or an artificial intelligence systems.

In an embodiment, the graduation system 108 can obtain, from the P2P securitization system 106, P2P data corresponding to the one or more peers 114 that may have contributed to the security deposit used to securitize the secured payment instrument 116. The P2P data may indicate the amount contributed by each of the one or more peers 114 for the security deposit, as well as identifying information associated with the one or more peers 114 (e.g., names, addresses, etc.). In addition to user information from the user accounts datastore 110, the graduation system 108 may use the P2P data from the P2P securitization system 106 to determine the contributions made by the user 112 and the one or more peers 114 to the security deposit used to securitize the secured payment instrument 116. In an embodiment, the graduation system 108, based on this determination, can solicit the user 112 and the one or more peers 114 to determine whether to graduate the secured payment instrument 116 to an unsecured payment instrument 118.

Based on responses from the user 112 and the one or more peers 114, the graduation system 108 may determine whether authorization has been provided for graduation of the secured payment instrument 116 to an unsecured payment instrument 118. For example, if the obtained responses indicate that a quorum amongst the user 112 and one or more peers 114 is present, the graduation system 108 may determine whether a majority of the responses approve of the offer for graduation. If a majority is detected, the graduation system 108 may determine that authorization has been granted for graduating the secured payment instrument 116 to an unsecured payment instrument 118. In some instances, each response may be weighed according to the corresponding respondent's (e.g., user 112 or peer 114) contribution to the security deposit. For example, if a peer contributed 60% of the total security deposit for securitization of the secured payment instrument 116, their response to the offer for graduation may be weighted such that their response accounts for 60% of the total responses to the offer.

In an embodiment, the offer for graduation includes information such as the terms for the graduation, an interest rate of the unsecured payment instrument 118, a credit limit of the unsecured payment instrument 118, when the graduation will be effective, whether the graduation is automatically accepted or automatically rejected based on no response by a certain date, and other such information. In an embodiment, the information (e.g., the terms for the graduation, an interest rate of the unsecured payment instrument 118, a credit limit of the unsecured payment instrument 118, when the graduation will be effective, whether the graduation is automatically accepted or automatically rejected based on no response by a certain date, etc.) included with the offer for graduation is provided to the user 112 (and any applicable peers 114, as described above) at a time when the account and/or the secured payment instrument 116 is created. In an embodiment, the information included with the offer for graduation changes during the existence of the account and/or the secured payment instrument 116. Changes to this information may be communicated to the user 112 and any applicable peers 114 at a time when the changes occur. In such instances, the user 112 may have an opportunity to accept or reject the changes by, for example, submitting a request to cancel the account associated with the secured payment instrument 116.

In an embodiment, if the user 112 (and any applicable peers 114 subject to the weight allocated for their responses, if applicable) accepts the offer for graduation of the secured payment instrument 116 to an unsecured payment instrument 118, the graduation system 108 can automatically disburse the security deposit associated with the secured payment instrument 116 subject to the pro rata contributions made by the user 112 and the one or more peers 114 to the security deposit. For instance, in response to the acceptance of the offer for graduation, the graduation system 108 may submit a request to a deposit service (not shown) associated with the payment instrument service 102 to retrieve the security deposit associated with the user's account. Once the graduation system 108 has obtained the security deposit from the deposit service, the graduation system 108 may disburse the security deposit to the user 112 and the one or more peers 114 according to their pro rata contribution to the security deposit.

In an embodiment, if a portion of the security deposit is required to pay down an existing balance associated with the secured payment instrument 116 prior to graduation of the secured payment instrument 116 to an unsecured payment instrument 118, the graduation system 108 may dynamically determine the pro rata distribution of the remainder of the security deposit for the user 112 and the one or more peers 114. For example, if the original security deposit was $1,000 and of this amount, $500 is required to pay down an existing balance prior to graduation of the secured payment instrument, the graduation system 108 may distribute the remaining $500 according to the contributions made by the user 112 and the one or more peers 114 to the original $1,000 security deposit. For instance, if a particular peer contributed $500 to the original security deposit (e.g., 50%), then the graduation system 108 would provide this particular peer with 50% of the remaining security deposit upon graduation, or $250.

In some instances, the user 112 and the one or more peers 114 may be assigned a rank according to their contributions such that a higher ranked contributor is reimbursed for their contribution to the security deposit prior to any other contributors. Returning the previous example, where a particular peer has contributed $500 of a total $1,000 security deposit and the amount remaining from the security deposit prior to graduation is $500, if this particular peer is ranked first amongst the user 112 and the other peers, this particular peer may be reimbursed their full contribution of $500, whereas the user 112 and the other peers may not be reimbursed for their contributions to the security deposit.

In addition to disbursing the security deposit to the user 112 and the one or more peers 114, the graduation system 108 may issue the unsecured payment instrument 118 to the user 112. For instance, the graduation system 108 may automatically cancel the account associated with the secured payment instrument 116 and generate a new account that is to be associated with the unsecured payment instrument 118. Further, the graduation system 108 may provide the user 112 with the unsecured payment instrument 118, such as through mailing of a physical payment instrument corresponding to the unsecured payment instrument 118 or providing executable instructions to associate a digital wallet with the new account corresponding to the unsecured payment instrument 118.

It should be noted that while machine learning algorithms or artificial intelligence may be implemented to identify a set of user peers 114 that may be recommended for solicitation of contributions towards a security deposit usable to securitize the secured payment instrument 116, the P2P securitization system 106 may perform this identification using other techniques. For example, the P2P securitization system 106 may obtain, from the user accounts datastore 110, the contact information associated with a set of user peers 114 provided by the user 112 in their application for the secured payment instrument 116 and/or previously associated with an existing user account. The P2P securitization system 106 may present the user 112 with this contact information and prompt the user 112 to select one or more user peers from the set of user peers 114 that may be solicited for a contribution to the security deposit for the secured payment instrument 116. In some instances, the P2P securitization system 106 may automatically select one or more user peers based on the recency of user communications with these one or more user peers.

Figure 2:
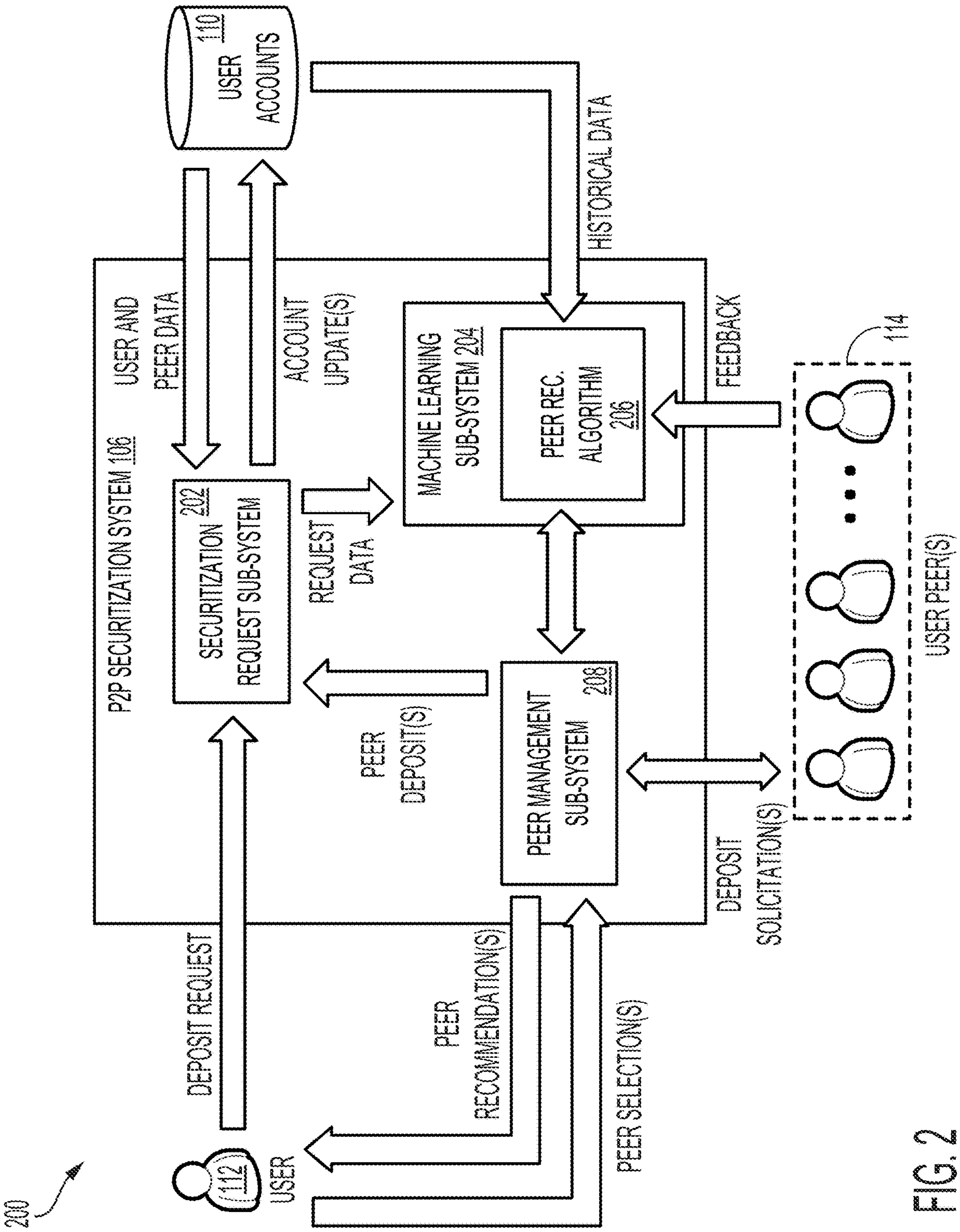
FIG. 2 shows an illustrative example of an environment in which a peer-to-peer securitization system automatically and in real-time generates a set of peer recommendations for soliciting one or more peers to obtain a security deposit for securitization of a secured payment instrument in accordance with at least one embodiment.

FIG. 2 shows an illustrative example of an environment 200 in which a P2P securitization system 106 automatically and in real-time generates a set of peer recommendations for soliciting one or more peers 114 to obtain a security deposit for securitization of a secured payment instrument in accordance with at least one embodiment. In the environment 200, a user 112 may submit a deposit request to a securitization request sub-system 202 of the P2P securitization system 106 to provide a contribution to the required security deposit for a secured payment instrument and to indicate that the user 112 would like to solicit one or more user peers 114 for the remainder of the required security deposit. The securitization request sub-system 202 may be implemented using a computer system of the P2P securitization system 106. In some instances, the securitization request sub-system 202 may be implemented as an application or executable process that is executed on a computer system of the P2P securitization system 106.

In an embodiment, the securitization request sub-system 202 queries a user accounts datastore 110 maintained by the payment instrument service to obtain any required information from the user's account that may be used to supplement the deposit request associated with the secured payment instrument. For instance, if the user 112 has previously provided contact information associated with one or more user peers 114 for other secured payment instruments or for other purposes (e.g., peers designated as emergency contacts, peers with whom the user 112 may engage with through the payment instrument service, etc.), the securitization request sub-system 202 may obtain this contact information from the user accounts datastore 110. In some instances, if the securitization request sub-system 202 determines that the user accounts datastore 110 does not maintain contact information associated with any peers that may be associated with the user 112 and that may be solicited for contributions to the security deposit required for the secured payment instrument, the securitization request sub-system 202 may prompt the user 112 to provide contact information associated with one or more user peers 114 that may potentially be solicited for these contributions.

The securitization request sub-system 202 may transmit the deposit request and the obtained contact information associated with one or more user peers 114 to a machine learning sub-system 204 implemented by the P2P securitization system 106. In an embodiment, the machine learning sub-system 204 implements a peer recommendation algorithm 206 that is dynamically trained to automatically generate recommendations for peers that may be solicited to contribute to a required security deposit for secured payment instruments. The peer recommendation algorithm 206 may be trained using supervised, unsupervised, reinforcement, or other such training techniques. For instance, the peer recommendation algorithm 206 may be dynamically trained using a dataset comprising sample user account information (e.g., sample user information, sample peer information, etc.) and historical data corresponding to this user account information from the user accounts datastore 110. This historical data may include contribution records corresponding to the sample user account information (e.g., contributions made by a sample user and sample peers towards security deposits associated with sample secured payment instruments, etc.). This dataset may be analyzed using the peer recommendation algorithm 206 to identify correlations between different elements of the dataset without supervision and feedback.

As an example of a supervised training technique, a dataset can be selected for training of the peer recommendation algorithm 206 to facilitate identification of correlations between user account information, solicitations for contributions to security deposits corresponding to secured payment instruments, and the actual contributions made to these security deposits. The peer recommendation algorithm 206 may be evaluated to determine, based on the sample inputs supplied to the peer recommendation algorithm 206, whether the peer recommendation algorithm 206 is producing accurate correlations between members of a dataset (e.g., given a user's account information and contact information associated with a set of user peers 114 from the user accounts datastore 110, the peer recommendation algorithm 206 is accurately recommending one or more user peers that are likely to contribute to the security deposit associated with a secured payment instrument). As an illustrative example of the training of the peer recommendation algorithm 206, an evaluator of the peer recommendation algorithm 206 may review the recommendations made by the peer recommendation algorithm 206 to determine whether these recommendations correspond to the user account information, contact information associated with the set of user peers 114, and any historical data corresponding to the user 112 and the set of user peers 114 obtained from the user accounts datastore 110. To determine whether these recommendations are appropriate, the evaluator may evaluate feedback corresponding to these recommendations. This feedback may include peer responses to requests for contributions to a security deposit, user selection of any of the recommended peers for solicitation of contributions towards the security deposit, and the like. The evaluator, using this feedback from the user 112 and/or the solicited peers may determine whether the recommendations made by the peer recommendation algorithm 206 are appropriate or otherwise consistent with the user account information. Accordingly, based on this evaluation, the evaluator may re-train and/or improve the peer recommendation algorithm 206 to improve the likelihood of the peer recommendation algorithm 206 making appropriate peer recommendations according to the user account information associated with the user 112.

In an embodiment, the peer recommendation algorithm 206 automatically obtains, in real-time, communications and transaction data corresponding to user 112 interactions with a set of user peers 114 through one or more P2P payment platforms as these interactions occur. As noted above, these communications and transaction data may include any messages exchanged between a user 112 and different peers through different communications sessions facilitated by the P2P payment platform. Further, the communications and transaction data may include information corresponding to transactions between the user 112 and these different peers through the P2P payment platform. The peer recommendation algorithm 206 may process these communications in real-time (such as through use of NLP or other such algorithms), along with the transaction data, contact information corresponding to the set of user peers 114, and any historical data associated with the user 112 and this set of user peers 114 obtained from the user accounts datastore 110, to generate a set of recommendations corresponding to one or more peers that may be solicited to contribute to the required security deposit for the secured payment instrument.

The output of the peer recommendation algorithm 206 may include a recommendation indicating one or more peers from the set of user peers 114 to which solicitations for contributions to the security deposit may be made. This output may be provided to a peer management sub-system 208 of the P2P securitization system 106. The peer management sub-system 208 may be implemented using a computer system of the P2P securitization system 106. In some instances, the peer management sub-system 208 may be implemented as an application or executable process that is executed on a computer system of the P2P securitization system 106. The peer management sub-system 208 may provide the recommendation generated by the peer recommendation algorithm 206 to the user 112. For instance, through an interface provided by the payment platform service, the peer management sub-system 208 may present identifying information corresponding to the one or more user peers the peer recommendation algorithm 206 has identified as being good candidates from which contributions to the security deposit may be obtained. Through this interface, the user 112 may select any peers from the set of user peers 114 that the user 112 may wish to solicit contributions to the security deposit associated with the secured payment instrument.

If the user 112 selects, through the aforementioned interface, one or more peers from which to solicit a contribution to the security deposit, the peer management sub-system 208 may automatically transmit a request to each of the selected one or more peers to solicit a contribution to the security deposit. The request may indicate an identifier corresponding to the user 112, an amount corresponding to the security deposit required for the secured payment instrument, and any other information that may be provided to the peer regarding the contribution. As noted above, the user 112 may indicate, in their selection of the one or more peers, the amount that is to be requested from each individual peer towards the total security deposit. This may allow the user 112 to tailor the solicitations made to the selected peers according to the user's preferences, which may be based on the user's personal knowledge of these selected peers. The solicitations made to the selected peers may be subject to a time limit, whereby the security deposit may need to be collected from the selected peers and/or from the user 112 before expiration of the time limit. As noted above, in some examples, if the amount obtained from the user 112 and/or from the selected peers towards the security deposit is less than the requested amount, the secured payment instrument may be assigned a credit limit according to the amount collected from the user 112 and/or the selected peers rather than to the original security deposit goal.

In an embodiment, any selections made by the user 112 of peers to which solicitations are to be provided for contributions to the security deposit are used to further train the peer recommendation algorithm 206. For example, if the user 112 selects one or more peers from those recommended by the peer recommendation algorithm 206, the machine learning sub-system 204 may use this selection of the one or more peers as a positive indication that the peer recommendation algorithm 206 has provided an accurate recommendation to the user 112 based on the contact information associated with the set of user peers 114 provided by the user 112, the user account information associated with the user 112 from the user accounts datastore 110, and any communications between the user 112 and any number of peers from the set of user peers 114. This positive indication or feedback may be used to reinforce the peer recommendation algorithm 206 such that, for similar users and corresponding peers, the peer recommendation algorithm 206 may provide similar recommendations. Alternatively, if the user 112 selects one or more peers other than those recommended by the peer recommendation algorithm 206, or foregoes selecting any peers for solicitation of contributions towards the security deposit, the machine learning sub-system 204 may use this selection of the one or more peers as a negative indication that the peer recommendation algorithm 206 has failed to provide an accurate recommendation to the user 112. This negative indication or feedback may be used to retrain the peer recommendation algorithm 206 such that, for similar users and corresponding peers, the peer recommendation algorithm 206 may provide alternative recommendations.

In addition to using user selections of peers from those recommended by the peer recommendation algorithm 206 as feedback used to train the peer recommendation algorithm 206, the machine learning sub-system 204 may obtain feedback from the peers solicited for contributions to the security deposit to further train the peer recommendation algorithm 206. For example, if the selected peers provide contributions to the security deposit, resulting in the required security deposit being obtained for the secured payment instrument, the machine learning sub-system 204 may use these contributions as a positive indication or feedback regarding the recommendation generated by the peer recommendation algorithm 206. This positive indication or feedback may be used to reinforce the peer recommendation algorithm 206 such that, for similar users and corresponding peers, the peer recommendation algorithm 206 may provide similar recommendations. Alternatively, if one or more of the selected peers refuse to provide a contribution to the security deposit, the machine learning sub-system 204 may use this refusal as a negative indication or feedback regarding the recommendation generated by the peer recommendation algorithm 206. In some instances, the machine learning sub-system 204 may prompt these one or more peers for additional feedback regarding their rationale for refusing to contribute to the security deposit. The refusal, as well as any additional feedback provided by these peers, may be used to retrain the peer recommendation algorithm 206 such that, for similar users and corresponding peers, the peer recommendation algorithm 206 may provide alternative recommendations.

The peer management sub-system 208, in an embodiment, may monitor user 112 and peer contributions to the security deposit in order to assign an allocation of rewards that may be provided to the user 112 and any peers that contributed to the security deposit as these rewards are earned. As noted above, the user 112 and any peers that contributed to the security deposit may be rewarded according to their pro rata contribution to the security deposit as the secured payment instrument is used for various transactions. Thus, as peer deposits are obtained, the peer management sub-system 208 may provide these deposits and data corresponding to the allocations assigned to the user 112 and contributing peers based on their contributions to the security deposit to the securitization request sub-system 202. The securitization request sub-system 202 may access the user accounts datastore 110 to update the user's account corresponding to the secured payment instrument to indicate the pro rata contribution to the security deposit made by the user 112 and/or any of the peers selected by the user 112.

In an embodiment, the peer recommendation algorithm 206 is implemented using one or more classical algorithms or processes that may be executed to identify one or more peers that may be solicited to contribute to a required security deposit for secured payment instruments. For instance, the peer recommendation algorithm 206 may be configured to automatically, and in real-time, process any communications exchanged between the user 112 and any of the user peers 114 through different communications sessions facilitated by the P2P payment platform. In some instances, the peer recommendation algorithm 206 may be executed as a plug-in application, browser extension, or any other form of application or module that may be executed within a browser application utilized by the user 112 to access the P2P payment platform and any other platform through which the user 112 may communicate with the user peers 114. For example, the peer recommendation algorithm 206 may be executed through the user's browser application such that, when executed, the peer recommendation algorithm 206 may automatically detect and process any communications exchanged between the user 112 and any of the user peers 114 through the P2P payment platform and any other P2P platform through which communications sessions may be established between the user 112 and these user peers 114 (e.g., social media platforms, instant messaging platforms, chat rooms, etc.).

The peer recommendation algorithm 206, in an embodiment, automatically processes any communications or interactions between the user 112 and any of the user peers 114 to identify any anchor terms or phrases that may denote a solicitation or other indication of the user's request for a user peer to contribute towards the required security deposit for the secured payment instrument. For instance, if the user 112 is engaged in a communications session with a particular user peer 114 (such as through the P2P payment platform or other P2P platform), the peer recommendation algorithm 206 may process, in real-time, communications exchanged between the user 112 and the user peer 114 to detect any anchor terms or phrases that may correspond to a user ask for a contribution to the security deposit for the secured payment instrument. As an illustrative example, if the user 112 transmits the message "Hey, I was wondering if you could chip in $200 towards my security deposit?," the peer recommendation algorithm 206, using NLP or other language processing, may detect the anchor terms and phrases "could chip in," "$200," and "security deposit" from the message. The anchor phrase "could chip in" may denote a request from the user 112 to the user peer 114 with regard to making a contribution towards something. Based on this identification of the "could chip in" anchor phrase, the peer recommendation algorithm 206 may determine that the anchor term "$200" denotes the amount that the user 112 is asking for with regard to the identified contribution request. Further, the peer recommendation algorithm 206 may determine that the anchor phrase "security deposit" denotes the purpose for the contribution which, in this case, corresponds to a security deposit required for a secured payment instrument.

If the peer recommendation algorithm 206 identifies, based on the real-time analysis of communications exchanged between the user 112 and any user peer 114 as these communications are exchanged, that the user 112 has solicited the user peer 114 for a contribution to the security deposit associated with the secured payment instrument, the peer recommendation algorithm 206 may automatically transmit a notification to the peer management sub-system 208 to transmit a request to the user peer 114 to formally solicit a contribution to the security deposit. As noted above, this request may indicate an identifier corresponding to the user 112, an amount corresponding to the security deposit required for the secured payment instrument, and any other information that may be provided to the user peer 114 regarding the contribution. If the original solicitation was communicated through a P2P platform other than the P2P payment platform, the peer management sub-system 208 may transmit a communication through some other medium (e.g., electronic mail, text message, phone message, etc.) to the identified user peer 114 to invite the user peer 114 to the P2P payment platform to review the solicitation and, if so desired, make the requested contribution to the security deposit. If the peer management sub-system 208 does not have the requisite contact information associated with the user peer 114 to invite the user peer 114 to the P2P payment platform, the peer management sub-system 208 may prompt the user 112 for contact information associated with the peer user 114.

In some instances, if the peer recommendation algorithm 206 determines that the user 112 has solicited a user peer 114 for a contribution to the security deposit associated with the secured payment instrument, the peer recommendation algorithm 206 may continue to process, in real-time, the communications or interactions between the user 112 and any of the user peers 114 to identify any anchor terms or phrases that may denote a response to the solicitation communicated by the user 112. As an illustrative example, if a peer user 114 transmits the message "I'm sorry, but I can't make a contribution to your security deposit," the peer recommendation algorithm 206, using NLP or other language processing, may detect the anchor terms and phrases "I can't," "contribution" and "security deposit" from the message communicated by the user peer 114. The anchor phrase "I can't" may denote a refusal on the part the user peer 114 with regard to something. Based on this identification of the "I can't" anchor phrase, the peer recommendation algorithm 206 may determine that the anchor term "contribution" denotes that the user peer 114 is refusing to make a contribution. Further, the peer recommendation algorithm 206 may determine that the anchor phrase "security deposit," as well as the prior communication by the user 112 may qualify that the purpose for the contribution corresponds to a security deposit required for a secured payment instrument associated with the user 112. Thus, based on this communication from user peer 114, the peer recommendation algorithm 206 may automatically determine that the user peer 114 has opted to reject the user's solicitation for a contribution to the security deposit.

If the peer recommendation algorithm 206 determines that the user peer 114 has rejected the user's solicitation for a contribution to the security deposit, the peer recommendation algorithm 206 may automatically update a contact list associated with the user 112 to indicate that the user peer 114 has opted to not contribute towards the security deposit. For example, if the peer management sub-system 208 maintains a contact list or other contact information associated with the set of user peers 114 provided by the user 112, the peer recommendation algorithm 206 may update this contact list or other contact information to indicate that the user peer 114 has rejected the user's solicitation. This may allow the user 112 to immediately identify the user peer 114 as being unlikely to provide a contribution towards security deposits associated with secured payment instruments. Accordingly, this may allow the user to forego communicating with the user peer 114 for future solicitations towards security deposits.

As another illustrative example, if a peer user 114 transmits the message "Sure, I'll contribute towards your security deposit," the peer recommendation algorithm 206, using NLP or other language processing, may detect the anchor terms and phrases "I'll contribute" and "security deposit" from the message communicated by the user peer 114. The anchor phrase "I'll contribute" may denote an acknowledgement and agreement to contribute towards something. Based on this identification of the "I'll contribute" anchor phrase, the peer recommendation algorithm 206 may determine that the anchor phrase "security deposit" denotes the object that the user peer 114 is accepting to making a contribution towards. Thus, based on this communication from user peer 114, the peer recommendation algorithm 206 may automatically determine that the user peer 114 has opted to make a contribution to the security deposit. Based on this determination, the peer recommendation algorithm 206 may automatically transmit a notification to the peer management sub-system 208 to transmit a request to the user peer 114 to formally solicit a contribution to the security deposit, as described above.

If the user peer 114 agrees to make a contribution towards the security deposit, the peer recommendation algorithm 206 may automatically update the contact list associated with the user 112 to indicate that the user peer 114 has opted to contribute towards the security deposit. For instance, the peer recommendation algorithm 206 may update the contact list or other contact information maintained by the peer management sub-system 208 on behalf of the user 112 to indicate that the user peer 114 has accepted the user's solicitation. This may allow the user 112 to immediately identify the user peer 114 as being favorable towards solicitations for contributions towards security deposits associated with secured payment instruments. Accordingly, this may allow the user to readily identify which user peers may be more willing to make contributions, which, in turn, may allow the user to focus communications with these user peers for future solicitations towards security deposits.

In some instances, the peer recommendation algorithm 206 may automatically process the contact list or other contact information maintained by the peer management sub-system 208 on behalf of the user 112 to recommend one or more user peers 114 that may be more likely to contribute towards the security deposit associated with the secured payment instrument. As noted above, the peer recommendation algorithm 206 may annotate the contact list or other contact information associated with the user 112 to identify user peers that either are likely to make contributions towards security deposits or are unlikely to make contributions towards security deposits. Accordingly, when the user 112 submits an application for a new secured payment instrument, the peer recommendation algorithm 206 may automatically parse the annotated contact list or other contact information to identify the user peers 114 that are likely to contribute towards the security deposit required for the new secured payment instrument. Through the peer management sub-system 208, the peer recommendation algorithm 206 may provide identification information corresponding to these identified user peers 114 to the user 112.

Figure 3:
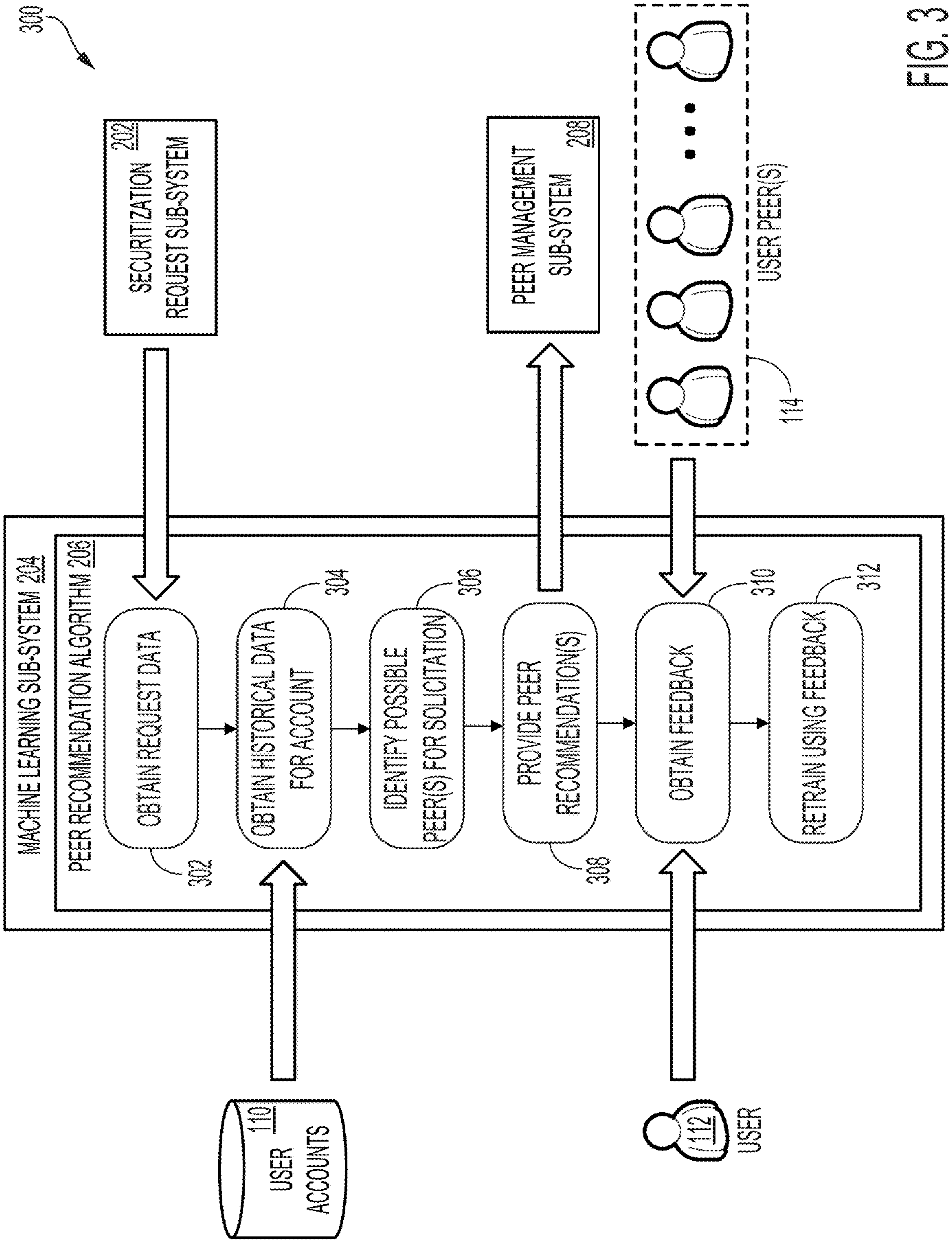
FIG. 3 shows an illustrative example of an environment in which a peer recommendation algorithm dynamically processes historical data corresponding to secured payment instruments and data corresponding to known peers to automatically generate a set of peer recommendations in accordance with at least one embodiment.

FIG. 3 shows an illustrative example of an environment 300 in which a peer recommendation algorithm 206 dynamically processes historical data corresponding to secured payment instruments and data corresponding to known peers to automatically generate a set of peer recommendations in accordance with at least one embodiment. As noted above, a securitization request sub-system 202 may transmit a deposit request from a user 112 and obtained contact information associated with one or more user peers 114 to a machine learning sub-system 204 implemented by the P2P securitization system. The machine learning sub-system may implement a peer recommendation algorithm 206 that is dynamically trained to automatically generate recommendations for peers that may be solicited to contribute to a required security deposit for secured payment instruments. The peer recommendation algorithm 206 may be trained using supervised, unsupervised, reinforcement, or other such training techniques. For instance, the peer recommendation algorithm 206 may be dynamically trained using a dataset comprising sample user account information and historical data corresponding to this user account information from the user accounts datastore 110.

At step 302, the peer recommendation algorithm 206 may obtain, from the securitization request sub-system 202, request data corresponding to a security deposit request submitted by a user 112 for securitization of their secured payment instrument. As noted above, in response to a user request to obtain a security deposit for securitization of a secured payment instrument, the securitization request sub-system 202 may query a user accounts datastore 110 to obtain any required information from the user's account that may be used to supplement the deposit request associated with the secured payment instrument. For instance, if the user 112 has previously provided contact information associated with one or more user peers 114 for other secured payment instruments or for other purposes, the securitization request sub-system 202 may obtain this contact information from the user accounts datastore 110. In some instances, if the securitization request sub-system 202 determines that the user accounts datastore 110 does not maintain contact information associated with any peers that may be associated with the user 112 and that may be solicited for contributions to the security deposit required for the secured payment instrument, the securitization request sub-system 202 may prompt the user 112 to provide contact information associated with one or more user peers 114 that may potentially be solicited for these contributions. The securitization request sub-system 202 may provide the request and the obtained contact information to the peer recommendation algorithm 206.

At step 304, the peer recommendation algorithm 206 may obtain historical data associated with the account from the user accounts datastore 110. The historical data may include contribution records corresponding to the user account (e.g., contributions made by a user and one or more peers towards security deposits associated with other secured payment instruments, etc.). Further, the historical data may include communications and transaction data corresponding to user 112 interactions with a set of user peers 114 through one or more P2P payment platforms as these interactions occur. As noted above, these communications and transaction data may include any messages exchanged between a user 112 and different peers through different communications sessions facilitated by the P2P payment platform. Further, the communications and transaction data may include information corresponding to transactions between the user 112 and these different peers through the P2P payment platform.

At step 306, the peer recommendation algorithm 206 may identify one or more peers from the set of user peers 114 that may be recommended for solicitation of contributions to the security deposit. For instance, the peer recommendation algorithm 206 may process the aforementioned communications in real-time (such as through use of NLP or other such algorithms), along with the transaction data, contact information corresponding to the set of user peers 114, and any historical data associated with the user 112 and this set of user peers 114 obtained from the user accounts datastore 110, to generate a set of recommendations corresponding to one or more peers that may be solicited to contribute to the required security deposit for the secured payment instrument.

At step 308, the peer recommendation algorithm 206 may provide one or more peer recommendations to the peer management sub-system 208. As noted above, the output of the peer recommendation algorithm 206 may include a recommendation indicating one or more peers from the set of user peers 114 to which solicitations for contributions to the security deposit may be made. The peer management sub-system 208 may provide the one or more peer recommendations generated by the peer recommendation algorithm 206 to the user 112 such as through an interface provided by the payment platform service. The peer management sub-system 208 may present identifying information corresponding to the one or more user peers selected by the peer recommendation algorithm 206 as being good candidates from which contributions to the security deposit may be obtained. Through this interface, the user 112 may select any peers from the set of user peers 114 that the user 112 may wish to solicit contributions to the security deposit associated with the secured payment instrument.

At step 310, the peer recommendation algorithm 206 may obtain feedback from the user 112 and/or the one or more peers from the set of user peers 114. As noted above, any selections made by the user 112 of peers to which solicitations are to be provided for contributions to the security deposit may be used to further train the peer recommendation algorithm 206. For example, if the user 112 selects one or more peers from those recommended by the peer recommendation algorithm 206, the machine learning sub-system 204 may use this selection of the one or more peers as a positive indication that the peer recommendation algorithm 206 has provided an accurate recommendation to the user 112 based on the contact information associated with the set of user peers 114 provided by the user 112, the user account information associated with the user 112 from the user accounts datastore 110, and any communications between the user 112 and any number of peers from the set of user peers 114. This positive indication or feedback may be used to reinforce the peer recommendation algorithm 206 such that, for similar users and corresponding peers, the peer recommendation algorithm 206 may provide similar recommendations.

Alternatively, if the user 112 selects one or more peers other than those recommended by the peer recommendation algorithm 206, or foregoes selecting any peers for solicitation of contributions towards the security deposit, the machine learning sub-system 204 may use this selection of the one or more peers as a negative indication that the peer recommendation algorithm 206 has failed to provide an accurate recommendation to the user 112. This negative indication or feedback may be used to retrain the peer recommendation algorithm 206 such that, for similar users and corresponding peers, the peer recommendation algorithm 206 may provide alternative recommendations.

The obtained feedback may further include any feedback provided by the peers solicited for contributions to the security deposit. For example, if the selected peers provide contributions to the security deposit, resulting in the required security deposit being obtained for the secured payment instrument, the machine learning sub-system 204 may use these contributions as a positive indication or feedback regarding the recommendation generated by the peer recommendation algorithm 206. This positive indication or feedback may be used to reinforce the peer recommendation algorithm 206 such that, for similar users and corresponding peers, the peer recommendation algorithm 206 may provide similar recommendations. Alternatively, if one or more of the selected peers have refused to provide a contribution to the security deposit, the machine learning sub-system 204 may use this refusal as a negative indication or feedback regarding the recommendation generated by the peer recommendation algorithm 206. In some instances, the machine learning sub-system 204 may prompt these one or more peers for additional feedback regarding their rationale for refusing to contribute to the security deposit. The refusal, as well as any additional feedback provided by these peers, may be used to retrain the peer recommendation algorithm 206 such that, for similar users and corresponding peers, the peer recommendation algorithm 206 may provide alternative recommendations.

Based on the obtained feedback, the machine learning sub-system 204 may, at step 312, retrain the peer recommendation algorithm 206. As noted above, if the user 112 selects one or more peers from those recommended by the peer recommendation algorithm 206 and/or the selected peers provide contributions to the security deposit, resulting in the required security deposit being obtained for the secured payment instrument, the machine learning sub-system 204 may use this feedback as a positive indication that the peer recommendation algorithm 206 has provided an accurate recommendation to the user 112. This positive indication or feedback may be used to reinforce the peer recommendation algorithm 206 such that, for similar users and corresponding peers, the peer recommendation algorithm 206 may provide similar recommendations. However, if the user 112 selects one or more peers other than those recommended by the peer recommendation algorithm 206, foregoes selecting any peers for solicitation of contributions towards the security deposit, and/or one or more of the selected peers have refused to provide a contribution to the security deposit, the machine learning sub-system 204 may use this feedback as a negative indication that the peer recommendation algorithm 206 has provided an accurate recommendation to the user 112. This negative feedback may be used to retrain the peer recommendation algorithm 206 such that, for similar users and corresponding peers, the peer recommendation algorithm 206 may provide alternative recommendations.

Figure 4:
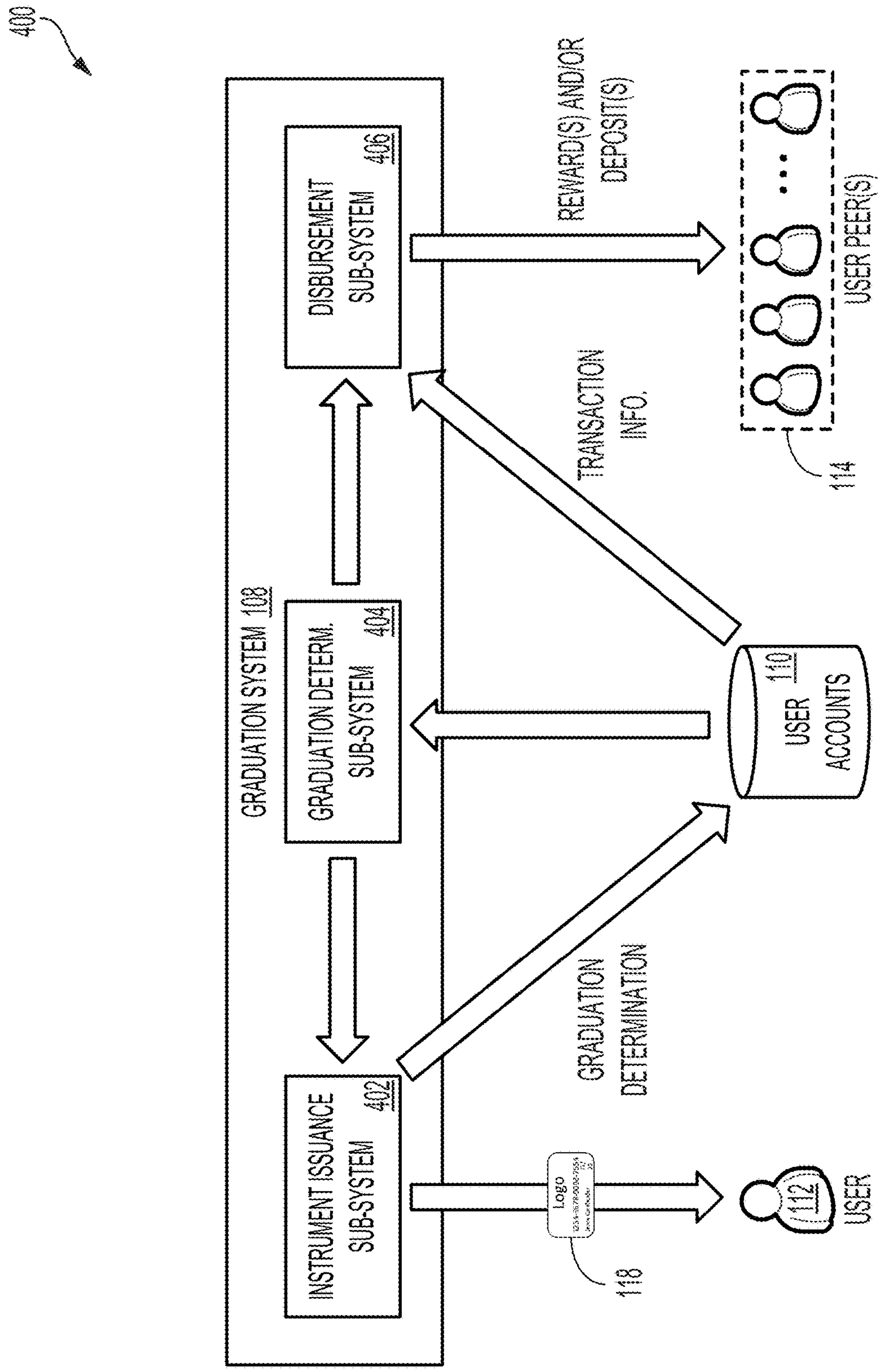
FIG. 4 shows an illustrative example of an environment in which a graduation system of a payment instrument service automatically disburses any rewards and security deposit amounts to peers that contributed to the security deposit for a secured payment instrument upon graduation of the secured payment instrument in accordance with at least one embodiment.

FIG. 4 shows an illustrative example of an environment 400 in which a graduation system 108 of a payment instrument service automatically disburses any rewards and security deposit amounts to peers that contributed to the security deposit for a secured payment instrument upon graduation of the secured payment instrument in accordance with at least one embodiment. In the environment 400, the graduation system 108 implements a disbursement sub-system 406 that monitors, in real-time, transactions performed using the secured payment instrument 116 to determine whether any rewards have been earned for the secured payment instrument 116. For instance, if the user 112 uses their secured payment instrument for particular transactions (e.g., qualified purchases, promotional offers, etc.), the disbursement sub-system 406 may evaluate account information associated with the secured payment instrument from the user accounts datastore 110 to determine whether the account is eligible for a cash back reward. As another illustrative example, the if the disbursement sub-system 406 determines that the account is associated with a loyalty rewards program, whereby loyalty rewards (e.g., points, coupons, discounts, etc.) are awarded per transaction involving the secured payment instrument, the disbursement sub-system 406 may determine whether the account is eligible for any loyalty rewards. The disbursement sub-system 406 may be implemented using a computer system of the graduation system 108. In some instances, the disbursement sub-system 406 may be implemented as an application or executable process that is executed on a computer system of the graduation system 108.

As noted above, as one or more rewards are earned for the account associated with the secured payment instrument, the disbursement sub-system 406 may determine how these one or more rewards may be distributed or otherwise made available to the user 112 and/or the peers that contributed to the security deposit associated with the secured payment instrument 116. As noted above, the P2P securitization system may monitor user 112 and peer contributions to the security deposit to assign an allocation of rewards that may be provided to the user 112 and any peers that contributed to the security deposit as these rewards are earned on a pro rata basis. Thus, if the P2P securitization system determines that the account is eligible for one or more rewards, the P2P securitization system may access the user accounts datastore 110 to determine the pro rata distribution for the one or more rewards. Returning to a previous illustrative example, whereby the P2P securitization system has assigned a 60% share of any rewards earned through use of the secured payment instrument to the first peer and assigned a 20% share to each of the user 112 and the second peer, if the account is eligible for a $100 cash back reward, the first peer may be allocated a $60 cash back reward (based on their assigned 60% share) and the user 112 and the second peer may each be allocated a $20 cash back reward. The disbursement sub-system 406 may obtain these allocations from the P2P securitization system for disbursement to the user 112 and/or the one or more peers 114 that contributed to the security deposit associated with the secured payment instrument.

As illustrated in FIG. 4, the graduation system 108 may implement a graduation determination sub-system 404 that may automatically monitor transactions associated with the secured payment instrument (such as through the user accounts datastore 110) to determine whether an offer of graduation may be provided to the user 112. The graduation determination sub-system 404 may be implemented using a computer system of the graduation system 108. In some instances, the graduation determination sub-system 404 may be implemented as an application or executable process that is executed on a computer system of the graduation system 108. In an embodiment, the determination of whether a secured payment instrument should be graduated to an unsecured payment instrument 118 and/or to trigger the processing of the graduation of the secured payment instrument to an unsecured payment instrument 118 is based on pre-determined criteria including, but not limited to, spending habits over a period of time, payment performance over a period of time, changes in credit scores over a period of time, and the like.

The graduation determination sub-system 404, in an embodiment, implements a machine learning algorithm or artificial intelligence that is dynamically trained to determine whether a secured payment instrument should be graduated to an unsecured payment instrument 118 and/or to trigger the processing of the graduation of the secured payment instrument 118 to an unsecured payment instrument. As noted above, the graduation determination sub-system 404 may implement a clustering algorithm to identify similar accounts, account holders, and/or secured payment instruments based on one or more vectors (e.g., spending habits, credit limits, payment performance, demographic information, credit scores, changes in credit scores, etc.). In some instances, a dataset of characteristics of accounts, users, and/or secured payment instruments may be analyzed using a clustering algorithm to determine whether a secured payment instrument should be graduated to an unsecured payment instrument and/or to trigger the processing of the graduation of the secured payment instrument to an unsecured payment instrument. Example clustering algorithms may be trained using the collected dataset. In an embodiment, clustering algorithms are trained using sample datasets of characteristics of accounts, customers, and/or secured payment instruments to classify accounts, users, and/or secured payment instruments in order to identify secured payment instruments that should be graduated to unsecured payment instruments and/or to trigger the processing of the graduation of the secured payment instrument to an unsecured payment instrument 118.

The graduation determination sub-system 404, based on the output of the machine learning algorithm or artificial intelligence, may determine whether a secured payment instrument should be graduated to an unsecured payment instrument 118 and/or whether to trigger the processing of the graduation of the secured payment instrument to an unsecured payment instrument 118. If the graduation determination sub-system 404 determines that the secured payment instrument may be graduated to an unsecured payment instrument 118, the graduation determination sub-system 404 may transmit a request to an instrument issuance sub-system 402 to prompt the user 112 to provide a response as to whether the user 112 wishes to have the secured payment instrument graduated to an unsecured payment instrument 118. The instrument issuance sub-system 402 may be implemented using a computer system of the graduation system 108. In some instances, the instrument issuance sub-system 402 may be implemented as an application or executable process that is executed on a computer system of the graduation system 108.

In an embodiment, the machine learning algorithm or artificial intelligence implemented by the graduation determination sub-system 404 may alter and/or otherwise update the pre-determined criteria based on additional data and/or updates to the machine learning algorithm or artificial intelligence. Further, the determination of whether a secured payment instrument should be graduated to an unsecured payment instrument 118 and/or to trigger the processing of the graduation of the secured payment instrument to an unsecured payment instrument 118 is made in concert using a combination of a financial services expert and one or more machine learning algorithms or an artificial intelligence systems.

In an embodiment, the graduation determination sub-system 404 further obtains, from the user accounts datastore 110, P2P data corresponding to the one or more peers 114 that may have contributed to the security deposit used to securitize the secured payment instrument. As noted above, the P2P data may indicate the amount contributed by each of the one or more peers 114 for the security deposit, as well as identifying information associated with the one or more peers 114 (e.g., names, addresses, etc.). In addition to user information from the user accounts datastore 110, the graduation determination sub-system 404 may use the P2P data to determine the contributions made by the user 112 and the one or more peers 114 to the security deposit used to securitize the secured payment instrument. Based on this determination, the graduation determination sub-system 404, through the instrument issuance sub-system 402, can solicit the user 112 and the one or more peers 114 to determine whether to graduate the secured payment instrument to an unsecured payment instrument 118.

The graduation determination sub-system 404 may process, in real-time, responses from the user 112 and the one or more peers 114, to determine whether authorization has been provided for graduation of the secured payment instrument to an unsecured payment instrument 118. For example, if the obtained responses indicate that a quorum amongst the user 112 and one or more peers 114 is present, the graduation determination sub-system 404 may determine whether a majority of the responses approve of the offer for graduation. If a majority is detected, the graduation determination sub-system 404 may determine that authorization has been granted for graduating the secured payment instrument to an unsecured payment instrument 118. In some instances, each response may be weighed according to the corresponding respondent's contribution to the security deposit, as described above.

As noted above, the offer for graduation provided by the instrument issuance sub-system 402 may include information such as the terms for the graduation, an interest rate of the unsecured payment instrument 118, a credit limit of the unsecured payment instrument 118, when the graduation will be effective, whether the graduation is automatically accepted or automatically rejected based on no response by a certain date, and other such information. In an embodiment, the information included with the offer for graduation is provided to the user 112 (and any applicable peers 114, as described above) at a time when the account and/or the secured payment instrument is created. In an embodiment, the information included with the offer for graduation changes during the existence of the account and/or the secured payment instrument. Changes to this information may be communicated to the user 112 and any applicable peers 114 at a time when the changes occur.

If the user 112 (and any applicable peers 114 subject to the weight allocated for their responses, if applicable) accepts the offer for graduation, the instrument issuance sub-system 402 may transmit a notification to the graduation determination sub-system 404 to indicate that the offer has been accepted. In response to this notification, the graduation determination sub-system 404 may transmit a notification to the disbursement sub-system 406 to automatically disburse the security deposit associated with the secured payment instrument subject to the pro rata contributions made by the user 112 and the one or more peers 114 to the security deposit. For instance, in response to the acceptance of the offer for graduation, the disbursement sub-system 406 may submit a request to a deposit service associated with the payment instrument service to retrieve the security deposit associated with the user's account. Once the disbursement sub-system 406 has obtained the security deposit from the deposit service, the disbursement sub-system 406 may disburse the security deposit to the user 112 and the one or more peers 114 according to their pro rata contribution to the security deposit.

As noted above, if a portion of the security deposit is required to pay down an existing balance associated with the secured payment instrument prior to graduation of the secured payment instrument to an unsecured payment instrument 118, the disbursement sub-system 406 may dynamically determine the pro rata distribution of the remainder of the security deposit for the user 112 and the one or more peers 114. Returning to a previously described example, if the original security deposit was $1,000 and of this amount, $500 is required to pay down an existing balance prior to graduation of the secured payment instrument, the disbursement sub-system 406 may distribute the remaining $500 according to the contributions made by the user 112 and the one or more peers 114 to the original $1,000 security deposit. For instance, if a particular peer contributed $500 to the original security deposit (e.g., 50%), then the disbursement sub-system 406 may provide this particular peer with 50% of the remaining security deposit upon graduation, or $250. In some instances, the user 112 and the one or more peers 114 may be assigned a rank according to their contributions such that a higher ranked contributor is reimbursed for their contribution to the security deposit prior to any other contributors. Returning the previous example, where a particular peer has contributed $500 of a total $1,000 security deposit and the amount remaining from the security deposit prior to graduation is $500, if this particular peer is ranked first amongst the user 112 and the other peers, this particular peer may be reimbursed their full contribution of $500, whereas the user 112 and the other peers may not be reimbursed for their contributions to the security deposit.

The instrument issuance sub-system 402 may issue the unsecured payment instrument 118 to the user 112. For instance, the instrument issuance sub-system 402 may provide the user 112 with the unsecured payment instrument 118, such as through mailing of a physical payment instrument corresponding to the unsecured payment instrument 118 or providing executable instructions to associate a digital wallet with the new account corresponding to the unsecured payment instrument 118. Upon issuance of the unsecured payment instrument 118, the graduation determination sub-system 404 may automatically cancel the account associated with the secured payment instrument and generate a new account that is to be associated with the unsecured payment instrument 118.

Figure 5:
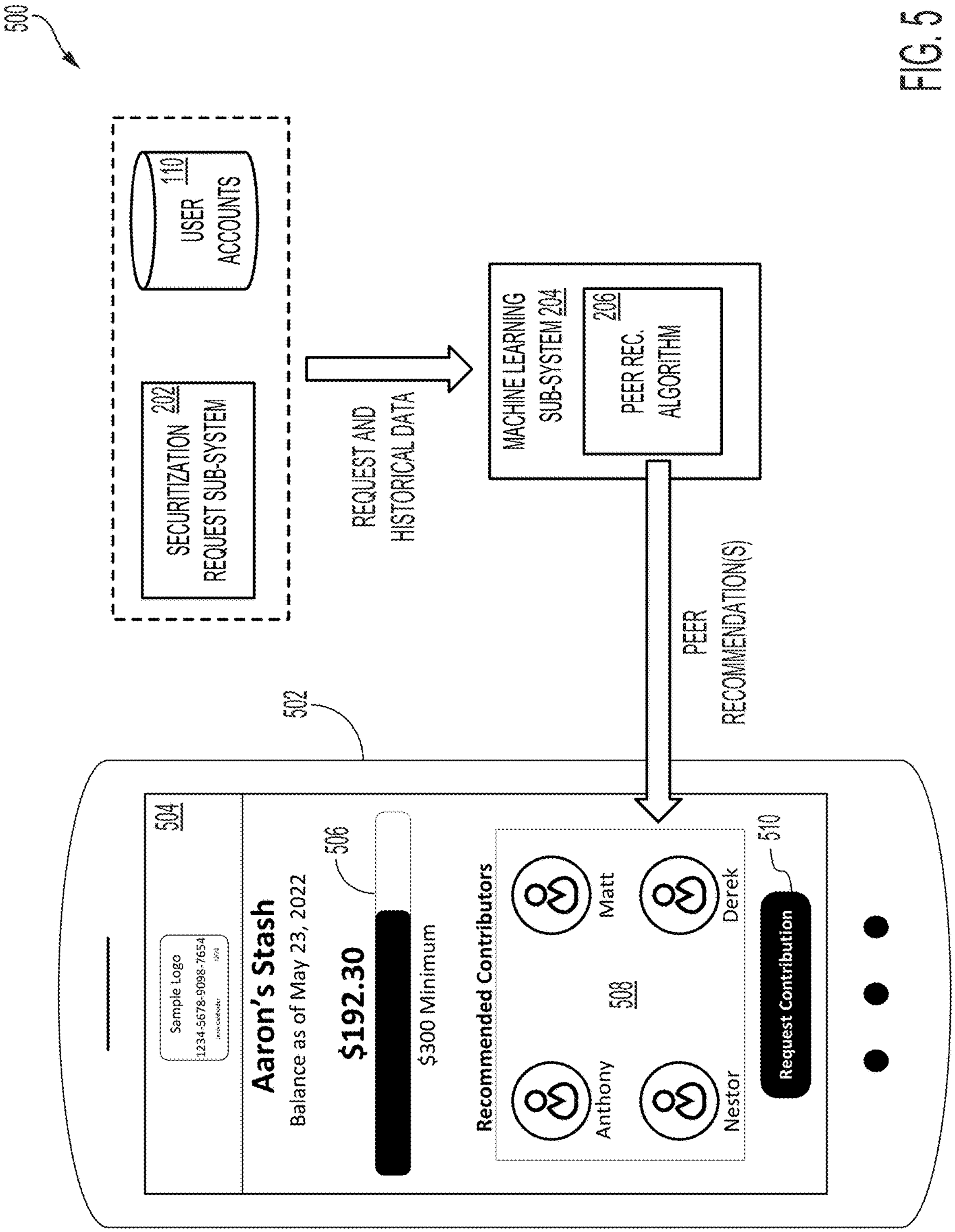
FIG. 5 shows an illustrative example of an environment in which one or more peer recommendations generated using a peer recommendation algorithm are presented through an interface provided by the payment instrument service in accordance with at least one embodiment.

FIG. 5 shows an illustrative example of an environment 500 in which one or more peer recommendations generated using a peer recommendation algorithm 206 are presented through an interface 504 provided by the payment instrument service in accordance with at least one embodiment. As noted above, the P2P securitization system implements a machine learning sub-system 204 that may dynamically train a peer recommendation algorithm 206 to automatically generate recommendations for peers that may be solicited to contribute to a required security deposit for secured payment instruments. In the environment 500, the peer recommendation algorithm 206 request and historical data from the securitization request sub-system 202 and the user accounts datastore 110, respectively, to automatically identify one or more peers from the set of user peers that may be recommended for solicitation of contributions to a security deposit.

As illustrated in FIG. 5, the peer recommendation algorithm 206 has identified, based on the automatic and real-time evaluation of the obtained request and historical data associated with a secured payment instrument that is to be issued to a particular user, a set of peers that may recommended to the user for solicitation of contributions to the required security deposit for the secured payment instrument. As noted above, the peer recommendation algorithm 206 may process real-time communications exchanged between the user and their peers in real-time (such as through use of NLP or other such algorithms), along with the transaction data corresponding to user interactions with a set of user peers through one or more P2P payment platforms, contact information corresponding to the set of user peers, and any historical data associated with the user and this set of user peers obtained from the user accounts datastore 110, to generate a set of recommendations corresponding to one or more peers that may be solicited to contribute to the required security deposit for the secured payment instrument.

Any identified peers to which solicitations for contributions to the security deposit associated with the secured payment instrument may be communicated to the user through an application or web portal provided by the payment instrument service. For example, as illustrated in FIG. 5, the peer recommendation algorithm 206 may communicate, through an interface 504 associated with an application executed through a user device 502 or with a web portal accessible through a browser application implemented on the user device 502, a recommended set of peers from which the user may solicit a contribution to a required security deposit. For example, the interface 504 may include a recommended contributors panel 508 through which the peer recommendation algorithm 206 may recommend a set of peers (e.g., "Anthony," "Matt," "Nestor," "Derek," etc.) that the peer recommendation algorithm 206 has identified as being likely to provide a contribution towards the required security deposit for the secured payment instrument.

In an embodiment, through the recommended contributors panel 508, the user can select one or more of the recommended peers from which to solicit a contribution towards the security deposit associated with the secured payment instrument. For instance, using a cursor or other interface element associated with the interface 504, the user may select one or more graphical representations of different peers from the recommended contributors panel 508 for solicitation of a contribution towards the security deposit. In some instances, the payment instrument service, through the interface 504, may allow the user to identify any additional or alternative peers that may be solicited for a contribution towards the security deposit. For example, through the interface 504, the user may provide contact information (e.g., electronic mailing addresses, usernames, etc.) associated with any peers not indicated through the recommended contributors panel 508 but that the user may want to solicit for contributions to the security deposit.

Once the user has made one or more peer selections from the recommended contributors panel 508 and/or through manual entry of contact information associated with one or more peers not indicated in the recommended contributors panel 508, the user may select a request contribution button 510 through the interface 504 to solicit the selected peers for contributions towards the required security deposit. If the user selects the request contribution button 510, payment instrument service may automatically transmit a request to each of the selected one or more peers to solicit a contribution to the security deposit. The request may indicate an identifier corresponding to the user, an amount corresponding to the security deposit required for the secured payment instrument (e.g., $300, as indicated in FIG. 5), and any other information that may be provided to the peer regarding the contribution. As noted above, the user may indicate, in their selection of the one or more peers, the amount that is to be requested from each individual peer towards the total security deposit. This may allow the user to tailor the solicitations made to the selected peers according to the user's preferences, which may be based on the user's personal knowledge of these selected peers. The solicitations made to the selected peers may be subject to a time limit, whereby the security deposit may need to be collected from the selected peers and/or from the user before expiration of the time limit. As noted above, in some examples, if the amount obtained from the user and/or from the selected peers towards the security deposit is less than the requested amount, the secured payment instrument may be assigned a credit limit according to the amount collected from the user and/or the selected peers rather than to the original security deposit goal.

In an embodiment, the peer recommendation algorithm 206 obtains feedback, from the user and/or the one or more selected peers, that can be used to re-train or reinforce the peer recommendation algorithm 206. For instance, any peer selections made through the recommended contributors panel 508 and/or through manual entry via the interface 504 may be used to further train the peer recommendation algorithm 206. For example, if the user selects one or more peers from those recommended via the recommended contributors panel 508, the machine learning sub-system 204 may use this selection of the one or more peers as a positive indication that the peer recommendation algorithm 206 has provided an accurate recommendation to the user based on the contact information associated with the set of user peers provided by the user, the user account information associated with the user from the user accounts datastore 110, and any communications between the user and any number of peers from the set of user peers. This positive indication or feedback may be used to reinforce the peer recommendation algorithm 206 such that, for similar users and corresponding peers, the peer recommendation algorithm 206 may provide similar recommendations. Alternatively, if the user 112 selects one or more peers other than those recommended by the peer recommendation algorithm 206 through the recommended contributors panel, or foregoes selecting any peers for solicitation of contributions towards the security deposit, the machine learning sub-system 204 may use this selection of the one or more peers as a negative indication that the peer recommendation algorithm 206 has failed to provide an accurate recommendation to the user. This negative indication or feedback may be used to retrain the peer recommendation algorithm 206 such that, for similar users and corresponding peers, the peer recommendation algorithm 206 may provide alternative recommendations.

In an embodiment, the machine learning sub-system 204 monitors, in real-time, peer responses to the provided solicitations, including any contributions to the security deposit and any rejections of the provided solicitations, to further train the peer recommendation algorithm 206. For example, if the selected peers provide contributions to the security deposit, resulting in the required security deposit being obtained for the secured payment instrument, the machine learning sub-system 204 may use these contributions as a positive indication or feedback regarding the recommendation generated by the peer recommendation algorithm 206. This positive indication or feedback may be used to reinforce the peer recommendation algorithm 206 such that, for similar users and corresponding peers, the peer recommendation algorithm 206 may provide similar recommendations. Alternatively, if one or more of the selected peers have refused to provide a contribution to the security deposit, the machine learning sub-system 204 may use this refusal as a negative indication or feedback regarding the recommendation generated by the peer recommendation algorithm 206. In some instances, the machine learning sub-system 204 may prompt these one or more peers for additional feedback regarding their rationale for refusing to contribute to the security deposit. The refusal, as well as any additional feedback provided by these peers, may be used to retrain the peer recommendation algorithm 206 such that, for similar users and corresponding peers, the peer recommendation algorithm 206 may provide alternative recommendations.

As illustrated in FIG. 5, in addition to providing a recommended set of peers from which the user may solicit a contribution to a required security deposit, the payment instrument service, through the interface 504, may further provide a security deposit indicator 506, through which the payment instrument service may indicate, in real-time, the amount obtained from the user and one or more peers towards the security deposit required for the secured payment instrument. For example, as illustrated in FIG. 5, the payment instrument service has indicated, through the security deposit indicator 506, that a total of $192.30 of a required $300 for the security deposit has been obtained from the user and one or more peers. As noted above, in order for the secured payment instrument to be issued to the user, the user may be required to obtain (from the user and/or from a set of peers) the total security deposit amount indicated by the payment instrument service. Thus, through the security deposit indicator 506, the user may determine whether additional contributions are required towards the security deposit associated with the secured payment instrument. If additional contributions are required, the user may select any additional peers not previously solicited for contributions (such as through the recommended contributors panel 508 and/or through manual entry via the interface 504) that may be solicited for the remainder of the security deposit amount. As additional solicitations are made, the machine learning sub-system 204 may use these solicitations to further train the peer recommendation algorithm 206 as described above.

As noted above, the payment instrument service may monitor, in real-time, user and peer contributions to the security deposit in order to assign an allocation of rewards that may be provided to the user and any peers that contributed to the security deposit as these rewards are earned. For instance, the user and any peers that contributed to the security deposit may be rewarded according to their pro rata contribution to the security deposit as the secured payment instrument is used for various transactions. Thus, as peer deposits are obtained, the payment instrument service may provide these deposits and data corresponding to the allocations assigned to the user and contributing peers based on their contributions to the security deposit to the securitization request sub-system 202. The securitization request sub-system 202 may access the user accounts datastore 110 to update the user's account corresponding to the secured payment instrument to indicate the pro rata contribution to the security deposit made by the user and/or any of the peers selected by the user through the interface 504.

Figure 6:
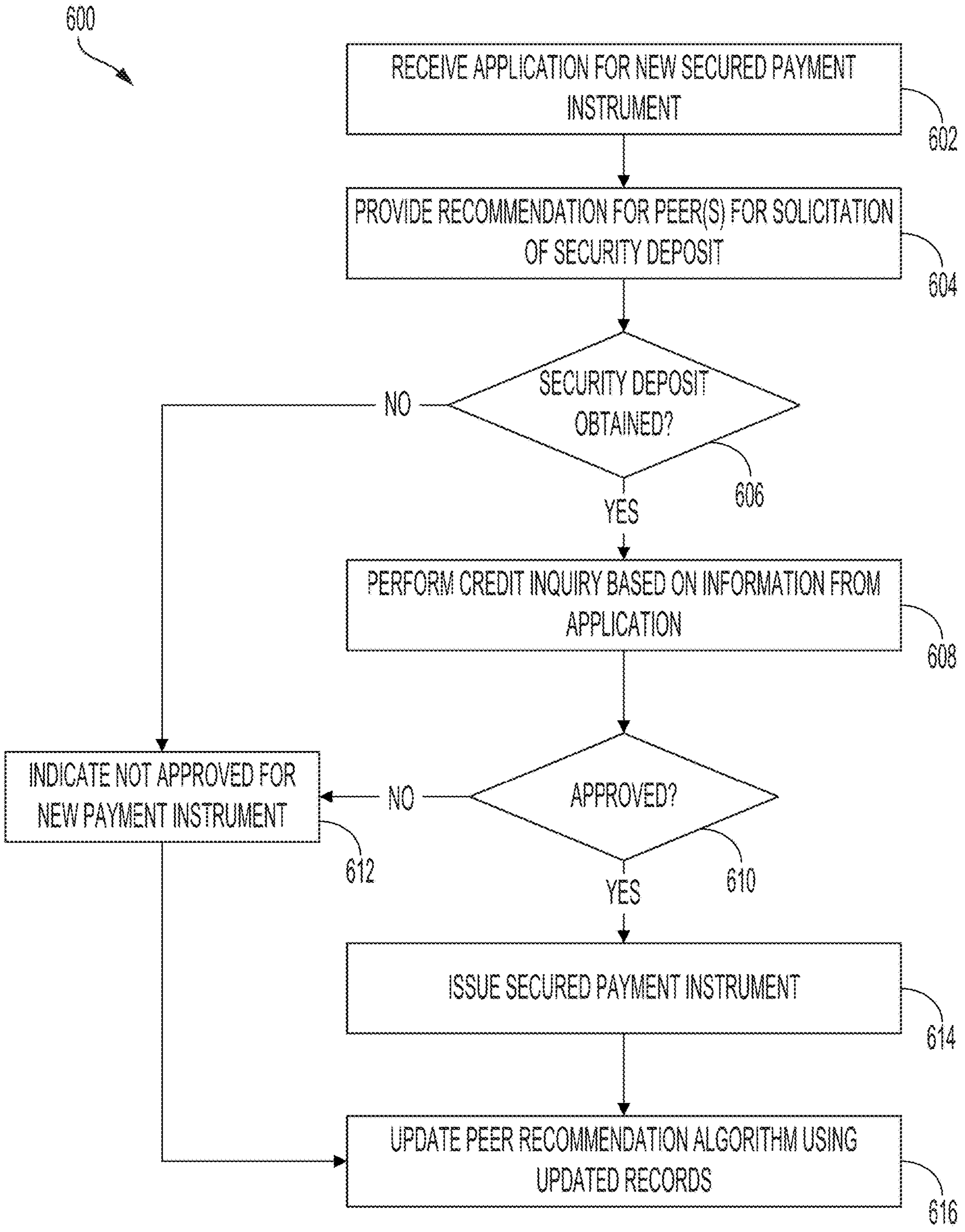
FIG. 6 shows an illustrative example of a process for issuing a secured payment instrument based on securitization of the secured payment instrument using contributions from a set of peers and based on a credit evaluation associated with a user in accordance with at least one embodiment.

FIG. 6 shows an illustrative example of a process 600 for issuing a secured payment instrument based on securitization of the secured payment instrument using contributions from a set of peers and based on a credit evaluation associated with a user in accordance with at least one embodiment. The process 600 may be performed by the payment instrument application system and P2P securitization system, as described above in connection with FIGS. 1-3.

At step 602, the payment instrument application system may receive an application for a new secured payment instrument. For instance, a user may submit an application or other request to the payment instrument application system to obtain a line of credit associated with a secured payment instrument. The application or other request submitted by the user may include information that may be used to perform a credit inquiry of the user's credit report to determine whether the user is qualified for a line of credit associated with a secured payment instrument. For instance, through the application or other request, the user may provide their legal name, birthdate, last four digits of their Social Security number, household income, and the like. The application or other request may further include contact information associated with a set of user peers that the user may be affiliated with. The contact information may include, for each user peer, a name (e.g., legal name, username associated with the payment instrument service or other entity, etc.), a physical address, a network address (e.g., e-mail address, etc.), a telephone number, demographic information, information denoting the relationship to the user, and the like. This contact information may be used to identify the set of user peers associated with the user and from which solicitations for contributions to a security deposit associated with the secured payment instrument may be requested.

In response to receiving a new application for a line of credit associated with a secured payment instrument, the payment instrument application system may provide the new application and the obtained contact information corresponding to a set of peers to a P2P securitization system, which at step 604 may provide a recommendation for one or more peers for solicitation of a security deposit that may be used to securitize the secured payment instrument. As noted above, the P2P securitization system may implement a peer recommendation algorithm that is dynamically trained to automatically identify, from provided contact information corresponding to a set of user peers, one or more peers that may be recommended to the user for soliciting contributions to the security deposit associated with the secured payment instrument. In some instances, the peer recommendation algorithm may further process, in real-time, communications and transaction data corresponding to user interactions with a set of user peers through one or more P2P payment platforms as these interactions occur. The communications and transaction data may include any messages exchanged between a user and different peers through different communications sessions facilitated by the P2P payment platform. Further, the communications and transaction data may include information corresponding to transactions between the user and these different peers through the P2P payment platform. This data, along with the provided contact information, may be used to generate a set of recommendations corresponding to one or more peers that may be solicited to contribute to the required security deposit for the secured payment instrument.

At step 606, the P2P securitization system may automatically, and in real-time, determine whether the required security deposit for the secured payment instrument has been obtained. For instance, if the user selects one or more peers from which to solicit a contribution to the security deposit, the P2P securitization system may automatically transmit a request to each of the selected one or more peers to solicit a contribution to the security deposit. These solicitations may be subject to a time limit, whereby the security deposit needs to be collected from the selected peers and/or from the user before expiration of the time limit. The P2P securitization system may monitor, in real-time, peer responses to the provided solicitations, including any contributions to the security deposit and any rejections of the provided solicitations, to determine whether the required security deposit has been obtained within the aforementioned time limit. If the P2P securitization system determines that the required security deposit has not been obtained, the P2P securitization system, at step 612, may transmit a notification to the payment instrument application system to indicate that the secured payment instrument could not be securitized. Accordingly, the payment instrument application system may automatically reject the application for the new secured payment instrument.

If the P2P securitization system determines that the security deposit has been obtained for the secured payment instrument, the P2P securitization system may transmit a notification to the payment instrument application system to indicate that the required security deposit has been obtained. This may cause the payment instrument application system, at step 608, to perform a credit inquiry based on information provided by the user through the application for the secured payment instrument. As noted above, the application submitted by a user may include information that may be used to perform a credit inquiry of the user's credit report to determine whether the user is qualified for a line of credit associated with a secured payment instrument. Using the obtained information from the application, the payment instrument application system may automatically submit a credit inquiry to a credit reporting service in order to obtain a credit evaluation for the user. The result of the credit inquiry may include one or more credit scores associated with the user, the current amount of credit allocated to the user from different financial entities (including the payment instrument service, if any), the current amount of credit available to the user, and the like.

Based on the result of the credit inquiry, the payment instrument application system, at step 610, may determine whether the user is approved for a new line of credit associated with a secured payment instrument. In an embodiment, the payment instrument application system implements a machine learning algorithm or artificial intelligence to determine whether the user is approved for the new line of credit. The machine learning algorithm or artificial intelligence may be implemented to automatically, and dynamically, evaluate the applications submitted by users for new lines of credit, as well as these users' credit histories as provided by one or more credit reporting services, to determine whether these users are approved for these new lines of credit. For instance, for the user that submitted the application, the machine learning algorithm or artificial intelligence may process the provided application, the result of the credit inquiry, and any existing user records from the user accounts datastore (such as the user accounts datastore 110 described above in connection with FIG. 1) to determine whether the user is approved for the new line of credit. For instance, based on the user's credit history, characteristics of the user (e.g., demographic information, etc.), and information provided in the application (e.g., current income, employment status, current employment title, length of employment, etc.), the machine learning algorithm or artificial intelligence may identify similarly situated users according to one or more vectors of similarity (e.g., credit scores, changes in credit scores, spending habits, total amount of credit allocated, total amount of credit available, payment performance, demographic information, etc.). These similarly situated users may correspond to secured payment instruments issued to these account holders and/or to applications that have been rejected based on the one or more vectors of similarity. The machine learning algorithm or artificial intelligence, in some instances, may analyze a dataset of characteristics of users and accounts to determine whether to approve or reject the submitted application. This dataset may include historical data corresponding to the applications for new lines of credit submitted by different users, the decisions made in response to these applications (e.g., approve or deny), the users' performance in maintaining the lines of credit associated with these payment instruments in good standing, historical changes to the users' credit scores while maintaining these lines of credit, and the like.

If the payment instrument application system determines that the user is not approved for a new line of credit associated with a secured payment instrument, the payment instrument application system, at step 612, may indicate that the user has not been approved for the applied for secured payment instrument. For instance, the payment instrument application system may transmit a notification to the user to indicate that the user has not been approved for the new line of credit. In some instances, the payment instrument application system may further provide the user with a rationale for the rejection of their application for the new line of credit. For example, if the user was rejected due to a poor credit score and a history of payment delinquencies, the payment instrument application system may generate a response that indicates that the poor credit score and the user's past history were contributing factors to the application being rejected. In some instances, any rationale provided may omit any specific metrics leading to rejection of the application. For example, the payment instrument application system may omit actual credit score values, descriptions of individual events corresponding to negative contributing factors towards rejection, and the like.

If the payment instrument application system determines that the user is approved for the new line of credit associated with the secured payment instrument, the payment instrument application system, at step 614, may issue the secured payment instrument to the user. For instance, the payment instrument application system may provide the user with the secured payment instrument, such as through mailing of a physical payment instrument corresponding to the secured payment instrument or providing executable instructions to associate a digital wallet with the new account corresponding to the secured payment instrument.

Regardless of whether a secured payment instrument is issued to the user or not, the P2P securitization system, at step 616, may update the aforementioned peer recommendation algorithm using the updated records corresponding to the processing of the received application. For instance, any peer selections made by the user for solicitation of contributions to the security deposit may be used to further train the peer recommendation algorithm. For example, if the user selects one or more peers from those recommended by the peer recommendation algorithm, the P2P securitization system may use this selection of the one or more peers as a positive indication that the peer recommendation algorithm has provided an accurate recommendation to the user Alternatively, if the user selects one or more peers other than those recommended by the peer recommendation algorithm or foregoes selecting any peers for solicitation of contributions towards the security deposit, the P2P securitization system may use this selection of the one or more peers as a negative indication that the peer recommendation algorithm has failed to provide an accurate recommendation to the user. Additionally, the P2P securitization system may monitor peer responses solicitations for a contribution to the security deposit in real-time to determine whether the selected peers have contributed to the security deposit or have opted not to contribute to the security deposit. As noted above, these peer contributions (or lack thereof) may be used as a form of feedback that may be used by the P2P securitization system to dynamically update the machine learning algorithm or artificial intelligence implemented to generate peer recommendations for solicitation of contributions to a security deposit.

It should be noted that, in some instances, the process 600 may include additional and/or alternative steps than those illustrated in FIG. 6. For example, if the amount obtained from the user and/or from the selected peers towards the security deposit is less than the requested amount, the P2P securitization system may transmit a notification to the payment instrument application system to indicate that the secured payment instrument is to have a credit limit according to the amount collected from the user and/or the selected peers rather than to the original security deposit goal. The payment instrument application system may provide the user with an indication of the new security deposit for the secured payment instrument. As this new security deposit (and corresponding credit limit) is less than the original security deposit being sought for the secured payment instrument, the payment instrument application system may provide the user with an option to either accept the secured payment instrument with the reduced security deposit and corresponding credit limit or to cancel their application for the secured payment instrument. This may allow the user to still obtain a secured payment instrument 116 even if the security deposit goal is not achieved.

Figure 7:
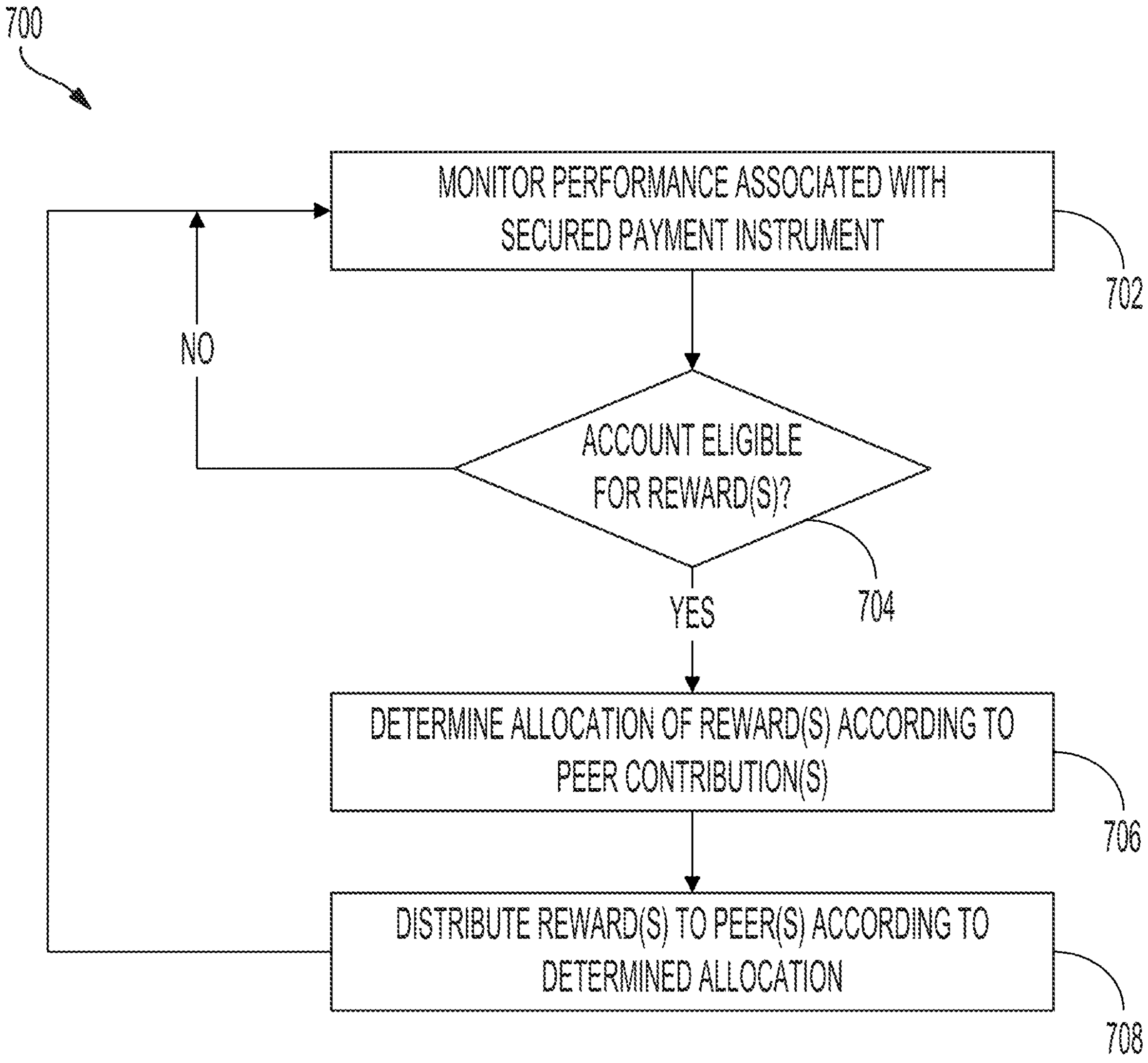
FIG. 7 shows an illustrative example of a process for allocating and distributing rewards associated with a secured payment instrument to peers that contributed to the securitization of the secured payment instrument according to their contributions in accordance with at least one embodiment.

FIG. 7 shows an illustrative example of a process 700 for allocating and distributing rewards associated with a secured payment instrument to peers that contributed to the securitization of the secured payment instrument according to their contributions in accordance with at least one embodiment. The process 700 may be performed by the P2P securitization system, which may monitor, in real-time, transactions performed using a secured payment instrument to determine whether any rewards have been earned for the secured payment instrument. Further, the P2P securitization system may determine how these rewards may be allocated to the user and/or to one or more peers that contributed to the security deposit used to securitize the secured payment instrument.

At step 702, the P2P securitization system may monitor, in real-time, the performance associated with the secured payment instrument. For instance, the P2P securitization system may monitor, in real-time, transactions associated with the secured payment instrument as these transactions occur. For example, when a user utilizes their secured payment instrument to make a purchase at a point-of-sale, information corresponding to this purchase may be obtained, in real-time, by the P2P securitization system.

At step 704, the P2P securitization system may evaluate the obtained transaction data corresponding to the transactions associated with the secured payment instrument to determine whether the account associated with the secured payment instrument is eligible for one or more rewards. For example, if a user uses their secured payment instrument for particular transactions (e.g., qualified purchases, promotional offers, etc.), the P2P securitization system may determine that the account associated with the secured payment instrument is eligible for a cash back reward. As another example, if the secured payment instrument is associated with a loyalty rewards program, whereby loyalty rewards (e.g., points, coupons, discounts, etc.) are awarded per transaction involving the secured payment instrument, the P2P securitization system may determine that the account associated with the secured payment instrument is eligible for one or more loyalty rewards. If the P2P securitization system determines that the secured payment instrument is not eligible for one or more rewards, the P2P securitization system may continue to monitor the performance associated with the secured payment instrument, thereby restarting the process 700.

If the secured payment instrument is eligible for one or more rewards, the P2P securitization system, at step 706, may determine an allocation of the one or more rewards according to the contributions made by the user and/or one or more peers associated with the user to the security deposit associated with the secured payment instrument. As noted above, the P2P securitization system may monitor user and peer contributions to the security deposit to assign an allocation of rewards that may be provided to the user and any peers that contributed to the security deposit as these rewards are earned on a pro rata basis. Thus, if the P2P securitization system determines that the account is eligible for one or more rewards, the P2P securitization system may access the user accounts datastore to determine the pro rata distribution for the one or more rewards. Returning to a previous illustrative example, whereby the P2P securitization system has assigned a 60% share of any rewards earned through use of the secured payment instrument to the first peer and assigned a 20% share to each of the user and the second peer, if the account is eligible for a $100 cash back reward, the P2P securitization system may determine that the first peer may be provided with a $60 cash back reward (based on their assigned 60% share) and that the user and the second peer may each be provided with a $20 cash back reward.

At step 708, the P2P securitization system may distribute the earned rewards to the user and/or the one or more peers that contributed to the security deposit associated with the secured payment instrument according to the determined allocation. For instance, if the payment instrument service maintains accounts for the user and the one or more peers that contributed to the security deposit associated with the secured payment instrument, the P2P securitization system may deposit, into these accounts, any earned rewards subject to the pro rata contribution to the security deposit. As an illustrative example, if the security deposit associated with the secured payment instrument is $500, where a first peer contributed $300 towards the security deposit and the user and a second peer each contributed $100 towards the security deposit, the P2P securitization system may distribute a 60% share of a reward earned through use of the secured payment instrument to the first peer and distribute a 20% share to each of the user and the second peer.

Figure 8:
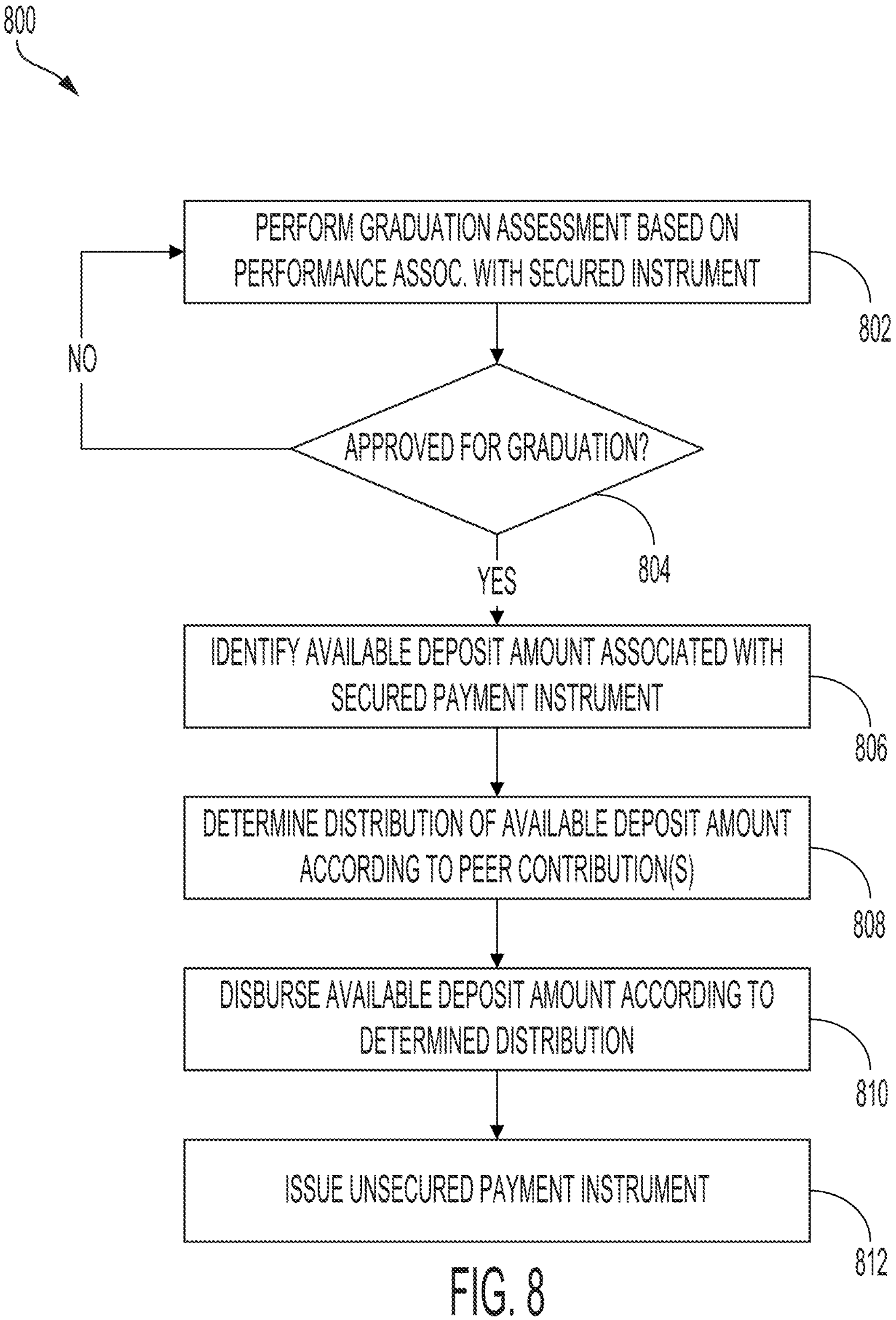
FIG. 8 shows an illustrative example of a process for distributing an available amount associated with a security deposit corresponding to a secured payment instrument to peers that contributed to the securitization of the secured payment instrument according to their contributions in accordance with at least one embodiment.

FIG. 8 shows an illustrative example of a process 800 for distributing an available amount associated with a security deposit corresponding to a secured payment instrument to peers that contributed to the securitization of the secured payment instrument according to their contributions in accordance with at least one embodiment. The process 800 may be performed by a graduation system implemented by the payment instrument service. As noted above, the graduation system may be implemented to monitor transactions associated with a secured payment instrument to determine whether the secured payment instrument may be graduated to an unsecured payment instrument.

At step 802, the graduation system may perform a graduation assessment based on a user's performance associated with a secured payment instrument. For instance, in an embodiment, the graduation system can automatically monitor transactions of the secured payment instrument to identify a user's spending habits and payment performance over a period of time. Further, the graduation system may query one or more credit reporting services to obtain the user's credit report over a period of time to identify any changes in credit scores over this period of time.

At step 804, the graduation system may determine whether the secured payment instrument is approved for graduation to an unsecured payment instrument. For instance, the determination of whether a secured payment instrument should be graduated to an unsecured payment instrument and/or to trigger the processing of the graduation of the secured payment instrument to an unsecured payment instrument may be based on pre-determined criteria including, but not limited to, spending habits over a period of time, payment performance over a period of time, changes in credit scores over a period of time, and the like.

In some instances, the graduation system may implement a machine learning algorithm or artificial intelligence to determine whether the secured payment instrument may be graduated to an unsecured payment instrument. For example, the graduation system may implement a clustering algorithm to identify similar accounts, account holders, and/or secured payment instruments based on spending habits, credit limits, payment performance, demographic information, credit scores, changes in credit scores, and the like. In some instances, a dataset of characteristics of accounts, users, and/or secured payment instruments may be analyzed using a clustering algorithm to determine whether a secured payment instrument should be graduated to an unsecured payment instrument and/or to trigger the processing of the graduation of the secured payment instrument to an unsecured payment instrument. Based on the output of the machine learning algorithm or artificial intelligence, a determination of whether a secured payment instrument may be graduated to an unsecured payment instrument and/or whether to trigger the processing of the graduation of the secured payment instrument to an unsecured payment instrument may be performed. If the graduation system determines that the secured payment instrument is not approved for graduation to an unsecured payment instrument, the graduation system may continue to perform graduation assessments, as described above, thereby restarting the process 800.

If the graduation system determines that the secured payment instrument may be graduated to an unsecured payment instrument, the graduation system, at step 806, may identify the available security deposit amount associated with the secured payment instrument. For example, if the graduation system determines that an amount of the security deposit associated with the secured payment instrument is required to pay down an existing balance associated with the secured payment instrument prior to graduation of the secured payment instrument, the graduation system may automatically deduct the existing balance from the security deposit to determine the available security deposit amount that may be disbursed to the user and/or to any peers that contributed to the security deposit. Alternatively, the graduation system may determine that the entire security deposit is available for disbursement to the user and/or to any peers that contributed to the security deposit.

At step 808, the graduation system may determine a distribution schema for the available amount of the security deposit according to the user and peer contributions to the security deposit. For example, if a portion of the security deposit is required to pay down an existing balance associated with the secured payment instrument prior to graduation of the secured payment instrument to an unsecured payment instrument, the graduation system may dynamically determine the pro rata distribution of the remainder of the security deposit for the user and the one or more peers. For example, if the original security deposit was $1,000 and of this amount, $500 is required to pay down an existing balance prior to graduation of the secured payment instrument, the graduation system may determine that the remaining $500 may be distributed according to the contributions made by the user and the one or more peers to the original $1,000 security deposit. For instance, if a particular peer contributed $500 to the original security deposit (e.g., 50%), then the graduation system would provide this particular peer with 50% of the remaining security deposit upon graduation, or $250. As another illustrative example of a distribution schema, the user and the one or more peers may be assigned a rank according to their contributions such that a higher ranked contributor is reimbursed for their contribution to the security deposit prior to any other contributors. Returning the previous example, where a particular peer has contributed $500 of a total $1,000 security deposit and the amount remaining from the security deposit prior to graduation is $500, if this particular peer is ranked first amongst the user and the other peers, this particular peer may be reimbursed their full contribution of $500, whereas the user and the other peers may not be reimbursed for their contributions to the security deposit. If the entire security deposit is available for disbursement, the graduation system may determine that the security deposit may be disbursed to the user and/or the one or more peers according to their pro rata contributions to the security deposit, as described above.

At step 810, the graduation system may disburse the available security deposit amount according to the determined distribution schema. For instance, the graduation system may automatically disburse the security deposit associated with the secured payment instrument subject to the pro rata contributions made by the user and the one or more peers to the security deposit. For example, the graduation system may submit a request to a deposit service associated with the payment instrument service to retrieve the security deposit associated with the user's account. Once the graduation system has obtained the security deposit from the deposit service, the graduation system may disburse the security deposit to the user and the one or more peers according to their pro rata contribution to the security deposit.

In an embodiment, the graduation system can provide, to the user and/or to the one or more peers that contributed to the security deposit, one or more disbursement options for disbursement of their allocated portion of the security deposit. These one or more disbursement options may include, but are not limited to, a bank account deposit, conversion to an instrument service debit card or other payment instrument, a retirement account deposit (e.g., individual retirement accounts (IRAs), Roth IRAs, 401(k) s, and/or 457s for federal employees, etc.), one or more bill payments (e.g., student loan pay down, credit card pay down, general bill pay, etc.), a college savings plan deposit (e.g., a 529 plan, etc.), one or more charitable donations, and the like. In some instances, the graduation system may provide a user and the one or more peers with an option to disburse their portion of the security deposit amongst any combination of the aforementioned disbursement options. As an illustrative and non-limiting example, the graduation system may allow a user or peer to allocate, for disbursement of their portion of the security deposit, a percentage of the resulting funds for deposit into a bank account and another percentage of the funds for deposit into a retirement account. As another illustrative example, the graduation system may allow the user or peer to specify a particular monetary amount from the security deposit for each of the available disbursement options presented to the user or peer. The disbursement of the security deposit may be performed automatically by the graduation system according to the one or more selections made by each user and/or peer that contributed to the security deposit.

At step 812, the graduation system may issue the unsecured payment instrument. For instance, the graduation system may automatically cancel the account associated with the secured payment instrument and generate a new account that is to be associated with the unsecured payment instrument. Further, the graduation system may provide the user with the unsecured payment instrument, such as through mailing of a physical payment instrument corresponding to the unsecured payment instrument or providing executable instructions to associate a digital wallet with the new account corresponding to the unsecured payment instrument.

Figure 9:
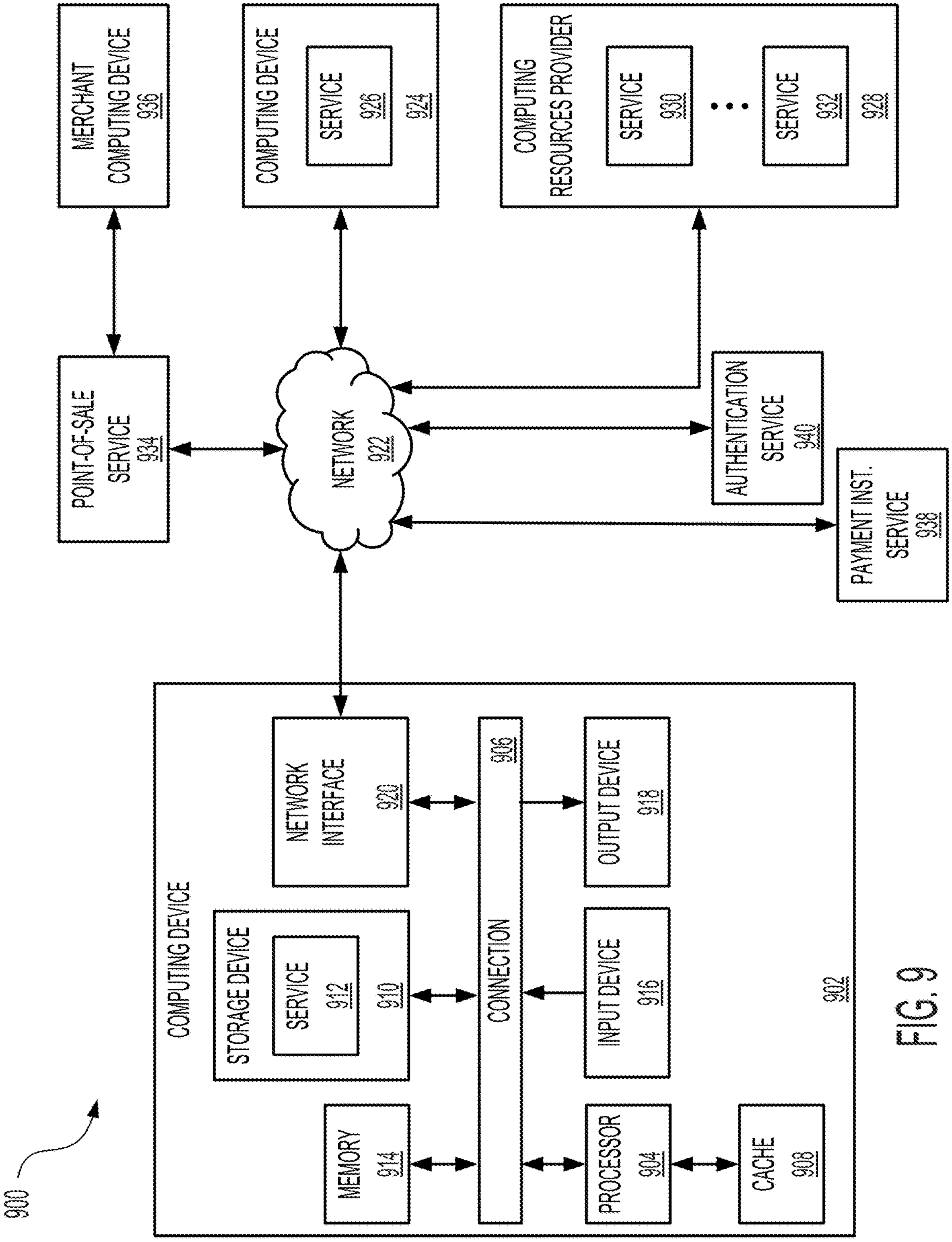
FIG. 9 shows a computing system architecture including various components in electrical communication with each other using a connection in accordance with various embodiments.

FIG. 9 illustrates a computing system architecture 900, including various components in electrical communication with each other, in accordance with some embodiments. The example computing system architecture 900 illustrated in FIG. 9 includes a computing device 902, which has various components in electrical communication with each other using a connection 906, such as a bus, in accordance with some implementations. The example computing system architecture 900 includes a processing unit 904 that is in electrical communication with various system components, using the connection 906, and including the system memory 914. In some embodiments, the system memory 914 includes read-only memory (ROM), random-access memory (RAM), and other such memory technologies including, but not limited to, those described herein. In some embodiments, the example computing system architecture 900 includes a cache 908 of high-speed memory connected directly with, in close proximity to, or integrated as part of the processor 904. The system architecture 900 can copy data from the memory 914 and/or the storage device 910 to the cache 908 for quick access by the processor 904. In this way, the cache 908 can provide a performance boost that decreases or eliminates processor delays in the processor 904 due to waiting for data. Using modules, methods and services such as those described herein, the processor 904 can be configured to perform various actions. In some embodiments, the cache 908 may include multiple types of cache including, for example, level one (L1) and level two (L2) cache. The memory 914 may be referred to herein as system memory or computer system memory. The memory 914 may include, at various times, elements of an operating system, one or more applications, data associated with the operating system or the one or more applications, or other such data associated with the computing device 902.

Other system memory 914 can be available for use as well. The memory 914 can include multiple different types of memory with different performance characteristics. The processor 904 can include any general purpose processor and one or more hardware or software services, such as service 912 stored in storage device 910, configured to control the processor 904 as well as a special-purpose processor where software instructions are incorporated into the actual processor design. The processor 904 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 904 can be a microprocessor, a microcontroller, a digital signal processor ("DSP"), or a combination of these and/or other types of processors. In some embodiments, the processor 904 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 900, an input device 916 can represent any number of input mechanisms, such as a microphone for speech, a touch-sensitive screen for gesture or graphical input, keyboard, mouse, motion input, pen, and other such input devices. An output device 918 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 900. In some embodiments, the input device 916 and/or the output device 918 can be coupled to the computing device 902 using a remote connection device such as, for example, a communication interface such as the network interface 920 described herein. In such embodiments, the communication interface can govern and manage the input and output received from the attached input device 916 and/or output device 918. As may be contemplated, there is no restriction on operating on any particular hardware arrangement and accordingly the basic features here may easily be substituted for other hardware, software, or firmware arrangements as they are developed.

In some embodiments, the storage device 910 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 910 can include hardware and/or software services such as service 912 that can control or configure the processor 904 to perform one or more functions including, but not limited to, the methods, processes, functions, systems, and services described herein in various embodiments. In some embodiments, the hardware or software services can be implemented as modules. As illustrated in example computing system architecture 900, the storage device 910 can be connected to other parts of the computing device 902 using the system connection 906. In an embodiment, a hardware service or hardware module such as service 912, that performs a function can include a software component stored in a non-transitory computer-readable medium that, in connection with the necessary hardware components, such as the processor 904, connection 906, cache 908, storage device 910, memory 914, input device 916, output device 918, and so forth, can carry out the functions such as those described herein.

The disclosed payment instrument service, the systems of the payment instrument service, and the systems and methods for dynamically, and in real-time, adjusting a credit limit associated with a secured payment instrument can be performed using a computing system such as the example computing system illustrated in FIG. 9, using one or more components of the example computing system architecture 900. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for dynamically, and in real-time, adjusting a credit limit associated with a secured payment instrument described herein by, for example, executing code using a processor such as processor 904 wherein the code is stored in memory such as memory 914 as described herein. One or more of a user device, a provider server or system, a database system, or other such devices, services, or systems may include some or all of the components of the computing system such as the example computing system illustrated in FIG. 9, using one or more components of the example computing system architecture 900 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 928. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 904 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 914 can be coupled to the processor 904 by, for example, a connector such as connector 906, or a bus. As used herein, a connector or bus such as connector 906 is a communications system that transfers data between components within the computing device 902 and may, in some embodiments, be used to transfer data between computing devices. The connector 906 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 914 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 914 can also include magnetic or optical data storage media including read-only (e.g., CD ROM and DVD ROM) or otherwise (e.g., CD or DVD). The memory can be local, remote, or distributed.

As described herein, the connector 906 (or bus) can also couple the processor 904 to the storage device 910, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 910. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 906 can also couple the processor 904 to a network interface device such as the network interface 920. The interface can include one or more of a modem or other such network interfaces including, but not limited to those described herein. It will be appreciated that the network interface 920 may be considered to be part of the computing device 902 or may be separate from the computing device 902. The network interface 920 can include one or more of an analog modem, Integrated Services Digital Network (ISDN) modem, cable modem, token ring interface, satellite transmission interface, or other interfaces for coupling a computer system to other computer systems. In some embodiments, the network interface 920 can include one or more input and/or output (I/O) devices. The I/O devices can include, by way of example but not limitation, input devices such as input device 916 and/or output devices such as output device 918. For example, the network interface 920 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 902 can be connected to one or more additional computing devices such as computing device 924 via a network 922 using a connection such as the network interface 920. In such embodiments, the computing device 924 may execute one or more services 926 to perform one or more functions under the control of, or on behalf of, programs and/or services operating on computing device 902. In some embodiments, a computing device such as computing device 924 may include one or more of the types of components as described in connection with computing device 902 including, but not limited to, a processor such as processor 904, a connection such as connection 906, a cache such as cache 908, a storage device such as storage device 910, memory such as memory 914, an input device such as input device 916, and an output device such as output device 918. In such embodiments, the computing device 924 can carry out the functions such as those described herein in connection with computing device 902. In some embodiments, the computing device 902 can be connected to a plurality of computing devices such as computing device 924, each of which may also be connected to a plurality of computing devices such as computing device 924. Such an embodiment may be referred to herein as a distributed computing environment.

The network 922 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 922 can be wired connections, wireless connections, or combinations thereof. Communications via the network 922 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 922, within the computing device 902, within the computing device 924, or within the computing resources provider 928 can include information, which also may be referred to herein as content. The information may include text, graphics, audio, video, haptics, and/or any other information that can be provided to a user of the computing device such as the computing device 902. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 902 and presented to a user of the computing device 902 using forms that are perceptible via sight, sound, smell, taste, touch, or other such mechanisms. In some embodiments, communications over the network 922 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 902 and/or the computing device 924 can be connected to a computing resources provider 928 via the network 922 using a network interface such as those described herein (e.g. network interface 920). In such embodiments, one or more systems (e.g., service 930 and service 932) hosted within the computing resources provider 928 (also referred to herein as within "a computing resources provider environment") may execute one or more services to perform one or more functions under the control of, or on behalf of, programs and/or services operating on computing device 902 and/or computing device 924. Systems such as service 930 and service 932 may include one or more computing devices such as those described herein to execute computer code to perform the one or more functions under the control of, or on behalf of, programs and/or services operating on computing device 902 and/or computing device 924.

For example, the computing resources provider 928 may provide a service, operating on service 930 to store data for the computing device 902 when, for example, the amount of data that the computing device 902 exceeds the capacity of storage device 910. In another example, the computing resources provider 928 may provide a service to first instantiate a virtual machine (VM) on service 932, use that VM to access the data stored on service 932, perform one or more operations on that data, and provide a result of those one or more operations to the computing device 902. Such operations (e.g., data storage and VM instantiation) may be referred to herein as operating "in the cloud," "within a cloud computing environment," or "within a hosted virtual machine environment," and the computing resources provider 928 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 928 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 930 and service 932 may implement versions of various services (e.g., the service 912 or the service 926) on behalf of, or under the control of, computing device 902 and/or computing device 924. Such implemented versions of various services may involve one or more virtualization techniques so that, for example, it may appear to a user of computing device 902 that the service 912 is executing on the computing device 902 when the service is executing on, for example, service 930. As may also be contemplated, the various services operating within the computing resources provider 928 environment may be distributed among various systems within the environment as well as partially distributed onto computing device 924 and/or computing device 902.

In an embodiment, the computing device 902 can be connected to one or more additional computing devices and/or services such as merchant computing device 936 and/or a point-of-sale service 934 via the network 922 and using a connection such as the network interface 920. In an embodiment, the point-of-sale service 934 is separate from the merchant computing device 936. In an embodiment, the point-of-sale service 934 is executing on the merchant computing device 936. In an embodiment, the point-of-sale service 934 is executing as one or more services (e.g., the service 930 and/or the service 932) operating within the environment of the computing resources provider. As used herein, a point-of-sale service 934 is a service used by one or more merchants to manage sales transactions for customers, to process payment transactions for customers (e.g., payment instrument transactions), to manage inventory for merchants, to identify customers based on, for example, customer loyalty programs, and other such tasks.

In an embodiment, a customer and/or a merchant uses the merchant computing device 936 to interact with the point-of-sale service 934. In an embodiment, the merchant computing device 936 is a dedicated point-of-service (POS) terminal. In an embodiment, the merchant computing device 936 is a cash register system. In an embodiment, the merchant computing device 936 is an application or web service operating on a computing device such as the computing device 902 described herein. In such an embodiment, the application or web service may be provided by a financial services system (e.g., a bank, a transaction processing system, an inventory management system, or some other such financial services system). In an embodiment, the merchant computing device 936 includes an auxiliary device or system to execute tasks associated with the point-of-sale service 934 (e.g., a payment instrument processing device attached to a smart phone or tablet). In an embodiment, the merchant computing device 936 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor. In an embodiment, the merchant computing device 936 is a virtual device (e.g., a virtual kiosk) such as the virtual devices described herein. Although not illustrated here, in an embodiment, the merchant computing device 936 may be one of a plurality of devices that may be interconnected using a network such as the network 922.

In an embodiment, the computing device 902 can be connected to one or more additional computing devices and/or services such as a payment instrument service 938 via the network 922 and using a connection such as the network interface 920. In an embodiment, the payment instrument service 938 connects directly with the point of sale service 934. In an embodiment, elements of the payment instrument service 938 are executing on the merchant computing device 936. In an embodiment, the payment instrument service 938 is executing as one or more services (e.g., the service 930 and/or the service 932) operating within the environment of the computing resources provider. As used herein, a payment instrument service 938 is a service used by various entities (e.g., merchants, financial institutions, and account holders) to manage payment instrument transactions (e.g., sales and payments), process payment, to issue payment instruments to account holders, and to perform other such actions.

In an embodiment, elements of the payment instrument service 938 are running as an application or web service operating on a computing device such as the computing device 902 described herein. In such an embodiment, the application or web service of the payment instrument service 938 may be provided by a financial services system (e.g., a bank, a transaction processing system, an inventory management system, or some other such financial services system). In an embodiment, elements of the payment instrument service 938 are running on an auxiliary device or system configured to execute tasks associated with the payment instrument service 938 (e.g., uses a payment instrument processing device attached to a smart phone or tablet). In an embodiment, elements of the payment instrument service 938 are running on virtual device such as those described herein. Although not illustrated here, in an embodiment, the payment instrument service 938 may be running on one or more of a plurality of devices that may be interconnected using a network such as the network 922.

In an embodiment, the computing device 902 can be connected to one or more additional computing devices and/or services such as an authentication service 940 via the network 922 and using a connection such as the network interface 920. In an embodiment, the authentication service 940 is an element of the payment instrument service 938. In an embodiment, the authentication service 940 is separate from the payment instrument service 938. In an embodiment, the authentication service 940 connects directly with the point of sale service 934. In an embodiment, elements of the authentication service 940 are executing on the merchant computing device 936. In an embodiment, the authentication service 940 is executing as one or more services (e.g., the service 930 and/or the service 932) operating within the environment of the computing resources provider. As used herein, an authentication service 940 is a service used by one or more merchants to authenticate transactions associated with payment instruments. An authentication service may be a third-party service that provides secure and verified authorization of the transactions.

In an embodiment, elements of the authentication service 940 are running as an application or web service operating on a computing device such as the computing device 902 described herein. In such an embodiment, the application or web service of the authentication service 940 may be provided by a financial services system (e.g., a bank, a transaction processing system, an inventory management system, or some other such financial services system). In an embodiment, elements of the authentication service 940 are running on an auxiliary device or system configured to execute tasks associated with the authentication service 940 (e.g., provides authentication using payment instrument processing device attached to a smart phone or tablet). In an embodiment, elements of the authentication service 940 are running on virtual device such as those described herein. Although not illustrated here, in an embodiment, the authentication service 940 may be running on one or more of a plurality of devices that may be interconnected using a network such as the network 922.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 902) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 902.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hercon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:

receiving an application for a secured payment instrument, wherein the application includes contact information corresponding to a set of peers associated with a user;

training a machine learning algorithm to automatically generate peer recommendations for different peers selectable for security deposit solicitations associated with different secured payment instruments, wherein the machine learning algorithm is trained by iteratively updating different coefficients of the machine learning algorithm according to outputs generated by the machine learning algorithm through iterative processing of a dataset including sample user account information, sample contributions to security deposits and associated with a set of sample peers, and actual contributions made by the set of sample peers to the security deposits;

processing the contact information through the machine learning algorithm to generate a peer recommendation corresponding to a subset of peers selectable for solicitations of a security deposit associated with the secured payment instrument;

monitoring user interaction with an interface to detect selection of one or more peers from the subset of peers presented in the peer recommendation, wherein the selection indicates individual security deposit amounts to be requested from the one or more peers;

transmitting a set of requests for the individual security deposit amounts towards the security deposit;

monitoring peer responses to the set of requests, wherein the peer responses include peer feedback and different security deposit amounts corresponding to the security deposit;

updating the dataset according to the peer feedback and other peer feedback corresponding to different security deposit amount requests associated with other applications for different secured payment instruments;

issuing the secured payment instrument, wherein the secured payment instrument is secured by the security deposit;

iteratively updating the different coefficients of the machine learning algorithm to obtain an updated machine learning algorithm, wherein the different coefficients are iteratively updated according to new outputs generated through iterative processing of the updated dataset and of transaction data corresponding to the secured payment instrument; and processing new applications for new secured payment instruments through the updated machine learning algorithm to generate new peer recommendations.

2. The computer-implemented method of claim 1, further comprising:

automatically processing transaction data corresponding to usage of the secured payment instrument in real-time to identify one or more rewards associated with the secured payment instrument; and distributing the one or more rewards according to the different security deposit amounts.

3. The computer-implemented method of claim 1, further comprising:

performing a credit evaluation associated with the user, wherein the credit evaluation is performed in response to obtaining the security deposit; and determining whether to issue the secured payment instrument based on the credit evaluation.

4. A system, comprising:

one or more processors; and memory storing thereon instructions that, as a result of being executed by the one or more processors, cause the system to:

receive an application for a secured payment instrument, wherein the application includes contact information corresponding to a set of peers associated with a user;

train a machine learning algorithm to automatically generate peer recommendations for different peers selectable for security deposit solicitations associated with different secured payment instruments, wherein the machine learning algorithm is trained by iteratively updating different coefficients of the machine learning algorithm according to outputs generated by the machine learning algorithm through iterative processing of a dataset including sample user account information, sample contributions to security deposits and associated with a set of sample peers, and actual contributions made by the set of sample peers to the security deposits;

process the contact information through the machine learning algorithm to generate a peer recommendation corresponding to a subset of peers selectable for solicitations of a security deposit associated with the secured payment instrument;

monitor user interaction with an interface to detect selection of one or more peers from the subset of peers presented in the peer recommendation, wherein the selection indicates individual security deposit amounts to be requested from the one or more peers;

transmit a set of requests for the individual security deposit amounts towards the security deposit;

monitor peer responses to the set of requests, wherein the peer responses include peer feedback and different security deposit amounts corresponding to the security deposit;

update the dataset according to the peer feedback and other peer feedback corresponding to different security deposit amount requests associated with other applications for different secured payment instruments;

issue the secured payment instrument, wherein the secured payment instrument is secured by the security deposit;

iteratively update the different coefficients of the machine learning algorithm to obtain an updated machine learning algorithm, wherein the different coefficients are iteratively updated according to new outputs generated through iterative processing of the updated dataset and of transaction data corresponding to the secured payment instrument; and process new applications for new secured payment instruments through the updated machine learning algorithm to generate new peer recommendations.

5. The system of claim 4, wherein the instructions further cause the system to:

automatically process transaction data corresponding to usage of the secured payment instrument in real-time to identify one or more rewards associated with the secured payment instrument; and distribute the one or more rewards according to the different security deposit amounts.

6. The system of claim 4, wherein the instructions further cause the system to:

perform a credit evaluation associated with the user, wherein the credit evaluation is performed in response to obtaining the security deposit; and determine whether to issue the secured payment instrument based on the credit evaluation.

7. A non-transitory, computer-readable storage medium storing thereon executable instructions that, as a result of being executed by one or more processors of a computer system, cause the computer system to:

receive an application for a secured payment instrument, wherein the application includes contact information corresponding to a set of peers associated with a user;

train a machine learning algorithm to automatically generate peer recommendations for different peers selectable for security deposit solicitations associated with different secured payment instruments, wherein the machine learning algorithm is trained by iteratively updating different coefficients of the machine learning algorithm according to outputs generated by the machine learning algorithm through iterative processing of a dataset including sample user account information, sample contributions to security deposits and associated with a set of sample peers, and actual contributions made by the set of sample peers to the security deposits;

process the contact information through the machine learning algorithm to generate a peer recommendation corresponding to a subset of peers selectable for solicitations of a security deposit associated with the secured payment instrument;

monitor user interaction with an interface to detect selection of one or more peers from the subset of peers presented in the peer recommendation, wherein the selection indicates individual security deposit amounts to be requested from the one or more peers;

transmit a set of requests for the individual security deposit amounts towards the security deposit;

monitor peer responses to the set of requests, wherein the peer responses include peer feedback and different security deposit amounts corresponding to the security deposit;

update the dataset according to the peer feedback and other peer feedback corresponding to different security deposit amount requests associated with other applications for different secured payment instruments;

issue the secured payment instrument, wherein the secured payment instrument is secured by the security deposit;

iteratively update the different coefficients of the machine learning algorithm to obtain an updated machine learning algorithm, wherein the different coefficients are iteratively updated according to new outputs generated through iterative processing of the updated dataset and of transaction data corresponding to the secured payment instrument; and process new applications for new secured payment instruments through the updated machine learning algorithm to generate new peer recommendations.

8. The non-transitory, computer-readable storage medium of claim 7, wherein the executable instructions further cause the computer system to:

automatically process transaction data corresponding to usage of the secured payment instrument in real-time to identify one or more rewards associated with the secured payment instrument; and distribute the one or more rewards according to the different security deposit amounts.

9. The non-transitory, computer-readable storage medium of claim 7, wherein the executable instructions further cause the computer system to:

perform a credit evaluation associated with the user, wherein the credit evaluation is performed in response to obtaining the security deposit; and determine whether to issue the secured payment instrument based on the credit evaluation.

10. The computer-implemented method of claim 1, further comprising:

processing in real-time messages exchanged between the user and a different subset of peers through a natural language processing (NLP) algorithm to generate an additional peer recommendation for additional requests for new security deposit amounts; and updating the interface to present the additional peer recommendation.

11. The computer-implemented method of claim 1, wherein the set of requests is subject to a time limit, and wherein the set of requests is automatically expired when the time limit is reached.

12. The computer-implemented method of claim 1, further comprising:

automatically monitoring transaction data corresponding to usage of the secured payment instrument to determine that the user is eligible for an offer to graduate the secured payment instrument to an unsecured payment instrument;

detecting an acceptance of the offer; and automatically disbursing the security deposit to the user and the one or more peers according to the different security deposit amounts.

13. The computer-implemented method of claim 1, further comprising:

processing historical transaction data corresponding to user interactions with the set of peers through the machine learning algorithm to generate an additional peer recommendation for additional requests for additional security deposit amounts, wherein the user interactions are performed through one or more peer-to-peer (P2P) payment platforms; and updating the interface to present the additional peer recommendation.

14. The system of claim 4, wherein the instructions further cause the system to:

process in real-time messages exchanged between the user and a different subset of peers through a natural language processing (NLP) algorithm to generate an additional peer recommendation for additional requests for new security deposit amounts; and update the interface to present the additional peer recommendation.

15. The system of claim 4, wherein the set of requests is subject to a time limit, and wherein the set of requests is automatically expired when the time limit is reached.

16. The system of claim 4, wherein the instructions further cause the system to:

automatically monitor transaction data corresponding to usage of the secured payment instrument to determine that the user is eligible for an offer to graduate the secured payment instrument to an unsecured payment instrument;

detect an acceptance of the offer; and automatically disburse the security deposit to the user and the one or more peers according to the different security deposit amounts.

17. The system of claim 4, wherein the instructions further cause the system to:

process historical transaction data corresponding to user interactions with the set of peers through the machine learning algorithm to generate an additional peer recommendation for additional requests for additional security deposit amounts, wherein the user interactions are performed through one or more peer-to-peer (P2P) payment platforms; and update the interface to present the additional peer recommendation.

18. The non-transitory, computer-readable storage medium of claim 7, wherein the executable instructions further cause the computer system to:

process in real-time messages exchanged between the user and a different subset of peers through a natural language processing (NLP) algorithm to generate an additional peer recommendation for additional requests for new security deposit amounts; and update the interface to present the additional peer recommendation.

19. The non-transitory, computer-readable storage medium of claim 7, wherein the set of requests is subject to a time limit, and wherein the set of requests is automatically expired when the time limit is reached.

20. The non-transitory, computer-readable storage medium of claim 7, wherein the executable instructions further cause the computer system to:

automatically monitor transaction data corresponding to usage of the secured payment instrument to determine that the user is eligible for an offer to graduate the secured payment instrument to an unsecured payment instrument;

detect an acceptance of the offer; and automatically disburse the security deposit to the user and the one or more peers according to the different security deposit amounts.

21. The non-transitory, computer-readable storage medium of claim 7, wherein the executable instructions further cause the computer system to:

process historical transaction data corresponding to user interactions with the set of peers through the machine learning algorithm to generate an additional peer recommendation for additional requests for additional security deposit amounts, wherein the user interactions are performed through one or more peer-to-peer (P2P) payment platforms; and update the interface to present the additional peer recommendation.

* * * * *